US008182338B2

(12) United States Patent
Thomas

(10) Patent No.: US 8,182,338 B2
(45) Date of Patent: May 22, 2012

(54) WAGERING GAME WITH MULTIPLIER FOR PROGRESSIVE FUND POOL

(75) Inventor: Alfred Thomas, Las Vegas, NV (US)

(73) Assignee: WMS Gaming Inc., Waukegan, IL (US)

( * ) Notice: Subject to any disclaimer, the term of this patent is extended or adjusted under 35 U.S.C. 154(b) by 688 days.

(21) Appl. No.: 12/296,059

(22) PCT Filed: Apr. 5, 2007

(86) PCT No.: PCT/US2007/008388
§ 371 (c)(1),
(2), (4) Date: Oct. 3, 2008

(87) PCT Pub. No.: WO2007/117502
PCT Pub. Date: Oct. 18, 2007

(65) Prior Publication Data

US 2009/0042638 A1 Feb. 12, 2009

Related U.S. Application Data

(60) Provisional application No. 60/789,866, filed on Apr. 5, 2006.

(51) Int. Cl.
*A63F 13/00* (2006.01)

(52) U.S. Cl. ........................................... 463/27; 463/25

(58) Field of Classification Search .................... 463/16, 463/20, 25, 26, 27
See application file for complete search history.

(56) References Cited

U.S. PATENT DOCUMENTS 4,624,459 A 11/1986 Kaufman .................. 273/143 R
4,837,728 A 6/1989 Barrie et al.
4,861,041 A 8/1989 Jones et al.
4,948,134 A 8/1990 Suttle et al. ..................... 273/85
5,116,055 A 5/1992 Tracy
5,249,800 A 10/1993 Hilgendorf et al.
5,275,400 A 1/1994 Weingardt et al. .............. 463/12

(Continued)

FOREIGN PATENT DOCUMENTS

CA 2298075 3/2000

(Continued)

OTHER PUBLICATIONS

International Search Report dated Aug. 20, 2006, PCT/US06/20953 (2 pages).

(Continued)

*Primary Examiner* — James S. McClellan
(74) *Attorney, Agent, or Firm* — Nixon Peabody LLP

(57) ABSTRACT

A method for playing wagering games at which players are eligible for a progressive game includes, responsive to receiving wager inputs from players, conducting wagering games in which players are eligible to win a progressive game. The method includes funding the progressive game by a portion of the wager inputs. The progressive game has a certain number of fund pools, each fund pool receiving a substantially equivalent share of the funding portion. The method also includes displaying a progressive-game award value that is substantially equivalent to an amount of one of the fund pools. In response to a player triggering a progressive-award winning outcome, a plurality of selectable elements are displayed to the player, each selectable element being associated with a progressive-game award multiplier that increases the progressive-game award value to an enhanced-progressive-award value. The progressive game multiplier dictates the number of the fund pools to be used to award the enhanced-progressive-award value to the player.

24 Claims, 9 Drawing Sheets

U.S. PATENT DOCUMENTS

| | | | | |
|---|---|---|---|---|
| 5,280,909 | A | 1/1994 | Tracy | |
| 5,344,144 | A | 9/1994 | Canon | |
| 5,377,973 | A | 1/1995 | Jones et al. | 273/85 C P |
| 5,393,057 | A | 2/1995 | Marnell, II | 273/85 CP |
| 5,417,430 | A | 5/1995 | Breeding | |
| 5,524,888 | A | 6/1996 | Heidel | 463/22 |
| 5,544,892 | A | 8/1996 | Breeding | 273/292 |
| 5,564,700 | A | 10/1996 | Celona | |
| 5,577,959 | A | 11/1996 | Takemoto | 463/25 |
| 5,580,063 | A | 12/1996 | Edwards | 273/378 |
| 5,580,309 | A | 12/1996 | Piechowiak et al. | 463/16 |
| 5,611,730 | A | 3/1997 | Weiss | |
| 5,639,088 | A | 6/1997 | Schneider et al. | 273/138.2 |
| 5,645,486 | A | 7/1997 | Nagao et al. | |
| 5,647,592 | A | 7/1997 | Gerow | |
| 5,655,961 | A | 8/1997 | Acres et al. | |
| 5,766,076 | A | 6/1998 | Pease et al. | |
| RE35,864 | E | 7/1998 | Weingardt | 463/28 |
| 5,779,549 | A | 7/1998 | Walker et al. | 463/42 |
| 5,816,918 | A | 10/1998 | Kelly et al. | 463/16 |
| 5,820,459 | A | 10/1998 | Acres et al. | 463/25 |
| 5,823,874 | A | 10/1998 | Adams | 463/17 |
| 5,830,063 | A | 11/1998 | Byrne | 463/18 |
| 5,839,956 | A | 11/1998 | Takemoto | 463/25 |
| 5,848,932 | A | 12/1998 | Adams | 463/20 |
| 5,851,147 | A | 12/1998 | Stupak et al. | |
| 5,855,515 | A | 1/1999 | Pease et al. | 463/27 |
| 5,876,284 | A | 3/1999 | Acres et al. | |
| 5,885,158 | A | 3/1999 | Torango et al. | |
| 5,941,773 | A | 8/1999 | Harlick | |
| 5,944,606 | A | 8/1999 | Gerow | |
| 5,951,011 | A | 9/1999 | Potter et al. | |
| 6,003,013 | A | 12/1999 | Boushy et al. | 705/10 |
| 6,007,427 | A | 12/1999 | Wiener et al. | 463/17 |
| 6,012,982 | A | 1/2000 | Piechowiak et al. | 463/16 |
| 6,017,032 | A | 1/2000 | Grippo et al. | 273/138.1 |
| 6,032,955 | A | 3/2000 | Luciano et al. | |
| 6,047,963 | A | 4/2000 | Pierce et al. | 273/121 B |
| 6,089,977 | A | 7/2000 | Bennett | 463/20 |
| 6,089,980 | A | 7/2000 | Gauselmann | |
| 6,102,474 | A | 8/2000 | Daley | 296/836 |
| 6,102,799 | A | 8/2000 | Stupak | |
| 6,110,043 | A | 8/2000 | Olsen | |
| 6,139,013 | A | 10/2000 | Pierce et al. | 273/121 B |
| 6,142,872 | A | 11/2000 | Walker et al. | 463/16 |
| 6,146,273 | A | 11/2000 | Olsen | 463/27 |
| 6,155,925 | A | 12/2000 | Giobbi et al. | 463/20 |
| 6,158,741 | A | 12/2000 | Koelling | 273/292 |
| 6,159,097 | A | 12/2000 | Gura | 463/20 |
| 6,168,523 | B1 | 1/2001 | Piechowiak et al. | 463/26 |
| 6,203,010 | B1 | 3/2001 | Jorash et al. | |
| 6,206,374 | B1 | 3/2001 | Jones | 273/292 |
| 6,206,782 | B1 | 3/2001 | Walker et al. | 463/25 |
| 6,210,275 | B1 | 4/2001 | Olsen | |
| 6,210,277 | B1 | 4/2001 | Stefan | 463/27 |
| 6,217,448 | B1 | 4/2001 | Olsen | |
| 6,220,593 | B1 | 4/2001 | Pierce et al. | 273/138.1 |
| 6,224,482 | B1 | 5/2001 | Bennett | |
| 6,224,484 | B1 | 5/2001 | Okuda et al. | |
| 6,231,445 | B1 | 5/2001 | Acres | |
| 6,241,608 | B1 | 6/2001 | Torango | |
| 6,254,483 | B1 | 7/2001 | Acres | 463/26 |
| 6,312,332 | B1 | 11/2001 | Walker et al. | 463/23 |
| 6,315,660 | B1 | 11/2001 | DeMar et al. | 463/16 |
| 6,319,125 | B1 | 11/2001 | Acres | 463/25 |
| 6,319,127 | B1 | 11/2001 | Walker et al. | 463/26 |
| 6,336,859 | B2 | 1/2002 | Jones et al. | 463/13 |
| 6,336,862 | B1 | 1/2002 | Byrne | |
| 6,345,824 | B1 | 2/2002 | Selitzky | 273/292 |
| 6,358,149 | B1 | 3/2002 | Schneider et al. | |
| 6,361,441 | B1 | 3/2002 | Walker et al. | 463/42 |
| 6,364,768 | B1 | 4/2002 | Acres et al. | 463/25 |
| 6,375,567 | B1 | 4/2002 | Acres | 463/25 |
| 6,375,568 | B1 | 4/2002 | Roffman et al. | 463/26 |
| 6,416,409 | B1 | 7/2002 | Jordan | |
| 6,431,983 | B2 | 8/2002 | Acres | |
| 6,435,968 | B1 | 8/2002 | Torango | 463/27 |
| 6,439,995 | B1 | 8/2002 | Hughs-Baird et al. | 463/20 |
| 6,482,089 | B2 | 11/2002 | DeMar et al. | 463/20 |
| 6,503,146 | B2 | 1/2003 | Walker et al. | 463/25 |
| 6,506,117 | B2 | 1/2003 | DeMar et al. | 463/20 |
| 6,508,707 | B2 | 1/2003 | DeMar et al. | 463/16 |
| 6,517,433 | B2 | 2/2003 | Loose et al. | 463/20 |
| 6,520,855 | B2 | 2/2003 | DeMar et al. | 463/20 |
| 6,577,733 | B1 | 6/2003 | Charrin | 380/251 |
| 6,589,115 | B2 | 7/2003 | Walker et al. | |
| 6,592,458 | B1 | 7/2003 | Ho | |
| 6,592,460 | B2 | 7/2003 | Torango | 463/27 |
| 6,599,186 | B1 | 7/2003 | Walker et al. | 463/17 |
| 6,599,188 | B2 | 7/2003 | Hirsch et al. | |
| 6,599,193 | B2 | 7/2003 | Baerlocher et al. | |
| 6,601,771 | B2 | 8/2003 | Charrin | 235/492 |
| 6,648,762 | B2 | 11/2003 | Walker et al. | 463/25 |
| 6,656,052 | B2 | 12/2003 | Abramopoulos et al. | |
| 6,676,513 | B2 | 1/2004 | Gauselmann | |
| 6,712,695 | B2 | 3/2004 | Mothwurf et al. | |
| 6,733,390 | B2 | 5/2004 | Walker et al. | 463/23 |
| 6,776,715 | B2 | 8/2004 | Price | |
| 6,887,154 | B1 | 5/2005 | Luciano, Jr. et al. | |
| 7,004,466 | B2 | 2/2006 | Gauselmann | |
| 7,036,012 | B2 | 4/2006 | Charrin | 713/169 |
| 7,056,215 | B1 | 6/2006 | Olive | |
| 7,255,645 | B2 | 8/2007 | Steil et al. | 463/27 |
| 7,371,168 | B2 * | 5/2008 | Bilyeu et al. | 463/20 |
| 7,455,585 | B2 * | 11/2008 | Englman | 463/16 |
| 7,578,737 | B2 | 8/2009 | Cregan et al. | 463/20 |
| 2002/0111209 | A1 | 8/2002 | Walker et al. | 463/25 |
| 2002/0138594 | A1 | 9/2002 | Rowe | 709/219 |
| 2002/0151345 | A1 | 10/2002 | Byrne | 463/18 |
| 2002/0155874 | A1 | 10/2002 | Byrne | 463/16 |
| 2003/0014370 | A1 | 1/2003 | Charrin | 705/65 |
| 2003/0027618 | A1 | 2/2003 | Byrne | 463/16 |
| 2003/0027625 | A1 | 2/2003 | Rowe | |
| 2003/0036430 | A1 | 2/2003 | Cannon | 463/42 |
| 2003/0045337 | A1 | 3/2003 | Byrne | 463/16 |
| 2003/0050106 | A1 | 3/2003 | Lyfoung | 463/13 |
| 2003/0060266 | A1 | 3/2003 | Baerlocher | 463/20 |
| 2003/0064776 | A1 | 4/2003 | Byrne | 463/16 |
| 2003/0109306 | A1 | 6/2003 | Karmarkar | 463/40 |
| 2003/0148808 | A1 | 8/2003 | Price | 463/27 |
| 2003/0181231 | A1 | 9/2003 | Vancura et al. | |
| 2003/0186733 | A1 | 10/2003 | Wolf et al. | 463/16 |
| 2003/0211884 | A1 | 11/2003 | Gauselmann | |
| 2003/0216166 | A1 | 11/2003 | Baerlocher et al. | 463/20 |
| 2003/0222402 | A1 | 12/2003 | Olive | |
| 2003/0228899 | A1 | 12/2003 | Evans | |
| 2003/0236116 | A1 | 12/2003 | Marks et al. | |
| 2004/0009808 | A1 | 1/2004 | Gauselmann | |
| 2004/0009811 | A1 | 1/2004 | Torango | 463/25 |
| 2004/0023716 | A1 | 2/2004 | Gauselmann | |
| 2004/0038741 | A1 | 2/2004 | Gauselmann | |
| 2004/0048644 | A1 | 3/2004 | Gerrard et al. | |
| 2004/0092304 | A1 | 5/2004 | George et al. | |
| 2005/0003880 | A1 | 1/2005 | Englman et al. | |
| 2005/0055113 | A1 | 3/2005 | Gauselmann | |
| 2005/0059467 | A1 | 3/2005 | Saffari et al. | |
| 2005/0059472 | A1 | 3/2005 | Joshi et al. | |
| 2005/0059481 | A1 | 3/2005 | Joshi et al. | |
| 2005/0064930 | A1 | 3/2005 | Jubinville et al. | |
| 2005/0096130 | A1 | 5/2005 | Mullins | |
| 2005/0137010 | A1 | 6/2005 | Enzminger et al. | |
| 2005/0192088 | A1 | 9/2005 | Hartman et al. | |
| 2005/0215313 | A1 | 9/2005 | O'Halloran | |
| 2005/0239542 | A1 | 10/2005 | Olsen | 463/27 |
| 2006/0003829 | A1 | 1/2006 | Thomas | |
| 2006/0019737 | A1 | 1/2006 | Yang | |
| 2006/0025195 | A1 | 2/2006 | Pennington et al. | |
| 2006/0025210 | A1 | 2/2006 | Johnson | |
| 2006/0030403 | A1 | 2/2006 | Lafky et al. | |
| 2006/0052159 | A1 | 3/2006 | Cahill et al. | |
| 2006/0073887 | A1 | 4/2006 | Nguyen et al. | |
| 2006/0073889 | A1 | 4/2006 | Edidin et al. | |
| 2006/0116201 | A1 | 6/2006 | Gauselmann | |
| 2006/0142079 | A1 | 6/2006 | Ikehara et al. | |
| 2006/0142086 | A1 | 6/2006 | Blackburn et al. | |
| 2006/0154718 | A1 | 7/2006 | Willyard et al. | |
| 2006/0178203 | A1 | 8/2006 | Hughes et al. | |

| | | | |
|---|---|---|---|
| 2006/0183535 | A1 | 8/2006 | Marks et al. |
| 2006/0183537 | A1 | 8/2006 | Dickerson |
| 2006/0183538 | A1 | 8/2006 | Michaelson et al. |
| 2006/0281527 | A1 | 12/2006 | Dunaevsky et al. |
| 2006/0287077 | A1 | 12/2006 | Grav et al. |
| 2007/0026941 | A1 | 2/2007 | Block et al. |
| 2007/0054733 | A1 | 3/2007 | Baerlocher |
| 2007/0060244 | A1 | 3/2007 | Yaldoo et al. |
| 2007/0060271 | A1 | 3/2007 | Cregan et al. |
| 2007/0060314 | A1 | 3/2007 | Baerlocher et al. |
| 2007/0060319 | A1 | 3/2007 | Block et al. |
| 2007/0060365 | A1 | 3/2007 | Tien et al. |
| 2007/0259711 | A1 | 11/2007 | Thomas |
| 2008/0015005 | A1 | 1/2008 | Yaldoo et al. |
| 2008/0015012 | A1 | 1/2008 | Englman et al. |

FOREIGN PATENT DOCUMENTS

| | | | |
|---|---|---|---|
| CA | 2334 546 | | 8/2001 |
| DE | 195 15 983 | | 11/1996 |
| DE | 196 24 321 | | 1/1998 |
| EP | 0521 599 | | 1/1993 |
| GB | 2153 572 | | 8/1985 |
| GB | 2181 589 | | 4/1987 |
| GB | 2242 300 | | 9/1991 |
| GB | 2313 792 | | 10/1997 |
| GB | 2313792 | A | 12/1997 |
| GB | 2333 880 | | 8/1999 |
| WO | 9903078 | | 1/1999 |
| WO | 9919037 | | 4/1999 |
| WO | WO 01/33478 | A1 | 5/2001 |
| WO | 03026754 | | 4/2003 |
| WO | 03083789 | | 10/2003 |
| WO | WO 2005/032675 | A2 | 4/2005 |
| WO | WO 2005/099425 | A2 | 10/2005 |
| WO | WO 2006/014990 | A2 | 2/2006 |
| WO | WO 2006/039349 | A2 | 4/2006 |
| WO | WO 2006/130597 | A2 | 12/2006 |
| WO | WO 2006/130611 | A2 | 12/2006 |
| WO | WO 2007/028108 | A2 | 3/2007 |
| WO | WO 2007/117502 | A2 | 10/2007 |
| WO | WO 2007/123858 | A2 | 11/2007 |
| WO | WO 2008/005366 | A2 | 1/2008 |
| WO | WO 2008/021449 | A2 | 2/2008 |
| WO | WO 2008/039403 | A2 | 4/2008 |
| WO | WO 2008/057356 | A2 | 5/2008 |
| WO | WO 2008/063297 | A2 | 5/2008 |
| WO | WO 2008/063394 | A2 | 5/2008 |

OTHER PUBLICATIONS

Article for “Easy Riches” by Sigma Game, Strictly Slots, 1 page (Aug. 2001).

Article for “Millioniser” by Glenn Haussman, Strictly Slots, pp. 50-53 (Mar. 2004).

Product Sheet for “Big Games Safari,” IGT, 24 pages (2000).

“New ’97 Games,” International Gaming & Wagering Business, 24 pages (Mar. 1997).

* cited by examiner

WAGERING GAME WITH MULTIPLIER FOR PROGRESSIVE FUND POOL

CROSS-REFERENCE TO RELATED APPLICATIONS

This application is a U.S. national phase of, and claims priority to, International Application No. PCT/US2007/008388 filed Apr. 5, 2007 which claims the benefit of priority of U.S. Provisional Patent Application No. 60/789,866, filed Apr. 5, 2006, both of which both of which are incorporated by reference in their entireties.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming machines and, more particularly, to a gaming machine having a multiplier for a progressive fund pool.

BACKGROUND OF THE INVENTION

Gaming machines, such as slot machines, video poker machines, and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning each machine is roughly the same (or believed to be the same), players are most likely to be attracted to the most entertaining and exciting of the machines.

Consequently, shrewd operators strive to employ the most entertaining and exciting machines available because such machines attract frequent play and, hence, increase profitability to the operator. In the competitive gaming machine industry, there is a continuing need for gaming machine manufacturers to produce new types of games, or enhancements to existing games, which will attract frequent play by enhancing the entertainment value and excitement associated with the game.

One concept that has been successfully employed to enhance the entertainment value of a game is that of a "bonus" game which may be played in conjunction with a "basic" game. The bonus game may comprise any type of game, either similar to or completely different from the basic game, and is entered upon the occurrence of a selected event or outcome of the basic game. Such a bonus game produces a significantly higher level of player excitement than the basic game because it provides a greater expectation of winning than the basic game.

Another concept that has been employed is the use of a progressive jackpot. In the gaming industry, a "progressive" involves collecting coin-in data from participating gaming device(s) (e.g., slot machines), contributing a percentage of that coin-in data to a jackpot amount, and awarding that jackpot amount to a player upon the occurrence of a certain jackpot-won event. The percentage of the coin-in is determined prior to any result being achieved and is independent of any result. A jackpot-won event typically occurs when a "progressive winning position" is achieved at a participating gaming device. If the gaming device is a slot machine, a progressive winning position may, for example, correspond to alignment of progressive jackpot reel symbols along a certain payline. The initial progressive jackpot is a predetermined minimum amount. That jackpot amount, however, progressively increases as players continue to play the gaming machine without winning the jackpot. Further, when several gaming machines are linked together such that several players at several gaming machines compete for the same jackpot, the jackpot progressively increases at a much faster rate, which leads to further player excitement.

SUMMARY OF THE INVENTION

In one embodiment, the present concepts include a method for playing wagering games at which players are eligible for a progressive game includes, responsive to receiving wager inputs from players, conducting wagering games in which players are eligible to win a progressive game. The method includes funding the progressive game by a portion of the wager inputs. The progressive game has a certain number of fund pools, each fund pool receiving a substantially equivalent share of the funding portion. The method also includes displaying a progressive-game award value that is substantially equivalent to an amount of one of the fund pools. In response to a player triggering a progressive-award winning outcome, a plurality of selectable elements are displayed to the player, each selectable element being associated with a progressive-game award multiplier that increases the progressive-game award value to an enhanced-progressive-award value. The progressive game multiplier dictates the number of the fund pools to be used to award the enhanced-progressive-award value to the player.

In accord with another embodiment, a method for playing wagering games at which players are eligible for a progressive game includes, in response to receiving wager inputs from the players, conducting wagering games in which the players are eligible to win the progressive game. The method also includes funding the progressive game by a portion of the wager inputs, the progressive game having a number of fund pools, said number being an integer between 2 and "n", each of the fund pools receiving a substantially equivalent share of the funding portion. A progressive-game award that is substantially equivalent to an amount of one of the fund pools is displayed and, in response to a player triggering a progressive game outcome, the method includes providing the player with a progressive-game multiplier that increases the progressive-game award to an enhanced-progressive-award value. The progressive-game multiplier is selected from a plurality of multipliers that have an integer value between 2 and "n."

In still another embodiment, a method for structuring a progressive-award is provided and includes the acts of receiving wager inputs at a plurality of gaming machines, providing a plurality of progressive-award fund pools, and displaying a progressive game award value substantially less than a cumulative value of the fund pools. The method also includes distributing a percentage of the wager inputs among the progressive-award fund pools, displaying a plurality of selectable elements, each of the selectable elements being related to a progressive-award enhancer, and selecting a selectable element to reveal a select progressive-award enhancer. The method further includes the act of determining an enhanced progressive-award value by summing a value of a number of the progressive-award fund pools corresponding to the progressive-award enhancer.

In another embodiment, a method for conducting a wagering game includes the steps of providing a predetermined number of progressive-award fund pools and displaying a plurality of selectable game elements response to achievement of a progressive-award winning outcome, the plurality of selectable game elements each being associated with one of a predetermined plurality of progressive-award multipliers. The method also includes determining an enhanced progressive-award value in accord with a progressive-award multiplier associated with a selected one of the plurality of selectable game elements, awarding to a player the enhanced progressive-award value, and aggregating a total remaining value associated with the progressive-award fund pools following the act of awarding, and distributing the aggregated total value among the progressive-award fund pools.

In yet another embodiment, a method of conducting a wagering game includes the acts of conducting a wagering game, achieving a progressive-award winning outcome in the wagering game, displaying a plurality of selectable elements, each of the selectable elements being related to a progressive-award multiplier, and determining an enhanced progressive-award value.

In still another embodiment, a method for structuring a progressive-award is provided and includes the acts of receiving wager inputs at a plurality of gaming machines, providing a plurality of at least substantially equal progressive-award fund pools, and distributing a percentage of the wager inputs among the progressive-award fund pools. The method also includes displaying a plurality of selectable elements, each of the selectable elements being related to a progressive-award multiplier, and selecting a selectable element to reveal a select progressive-award multiplier. The method further includes the act of determining an enhanced progressive-award value by summing a value of a number of the progressive-award fund pools corresponding to the progressive-award multiplier.

In yet another aspect, a gaming system is provided including a wager input device for receiving a wager to play a wagering game, a display for displaying a randomly selected outcome, and a controller. The controller is operative to conduct a wagering game, achieve a progressive-award winning outcome in the wagering game, display a plurality of selectable elements, each of the selectable elements being related to a progressive-award enhancer, and determine an enhanced progressive-award value.

The above summary of the present invention is not intended to represent each embodiment or every aspect of the present invention. The detailed description and Figures will describe many of the embodiments and aspects of the present invention.

BRIEF DESCRIPTION OF THE DRAWINGS

The foregoing and other advantages of the invention will become apparent upon reading the following detailed description and upon reference to the drawings.

Figure 1A:
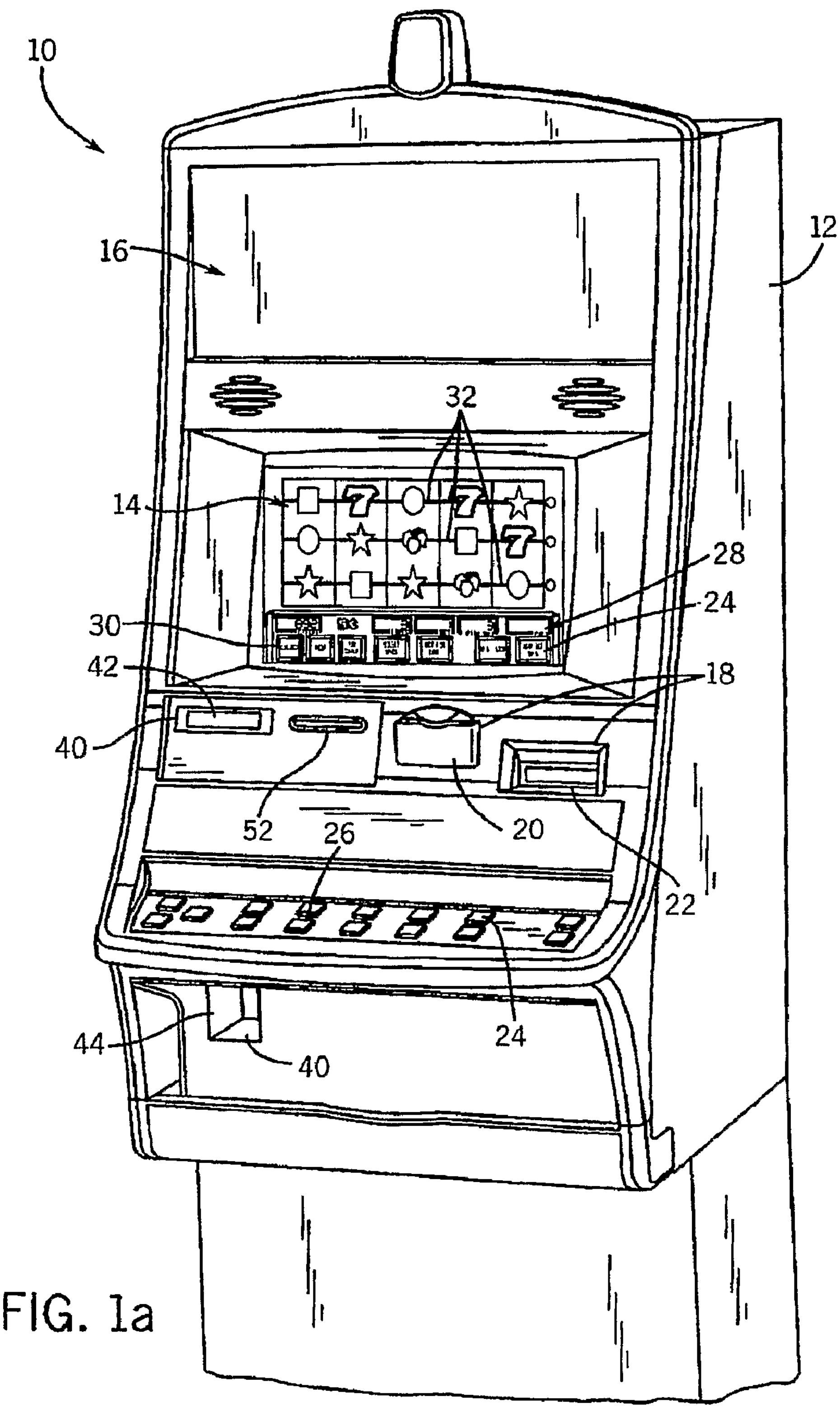
FIG. 1*a* is a perspective view of a free standing gaming machine embodying the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DESCRIPTION OF ILLUSTRATIVE EMBODIMENTS

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1*a*, a gaming machine 10 is used in gaming establishments such as casinos. With regard to the present invention, the gaming machine 10 may be any type of gaming machine and may have varying structures and methods of operation. For example, the gaming machine 10 may be an electromechanical gaming machine configured to play mechanical slots, or it may be an electronic gaming machine configured to play a video casino game, such as blackjack, slots, keno, poker, blackjack, roulette, etc.

The gaming machine 10 comprises a housing 12 and includes input devices, including a value input device 18 and a player input device 24. For output the gaming machine 10 includes a primary display 14 for displaying information about the basic wagering game. The primary display 14 can also display information about a bonus wagering game and a progressive wagering game. The gaming machine 10 may also include a secondary display 16 for displaying game events, game outcomes, and/or signage information. While these typical components found in the gaming machine 10 are described below, it should be understood that numerous other elements may exist and may be used in any number of combinations to create various forms of a gaming machine 10.

The value input device 18 may be provided in many forms, individually or in combination, and is preferably located on the front of the housing 12. The value input device 18 receives currency and/or credits that are inserted by a player. The value input device 18 may include a coin acceptor 20 for receiving coin currency (see FIG. 1*a*). Alternatively, or in addition, the value input device 18 may include a bill acceptor 22 for receiving paper currency. Furthermore, the value input device 18 may include a ticket reader, or barcode scanner, for reading information stored on a credit ticket, a card, or other tangible portable credit storage device. The credit ticket or card may also authorize access to a central account, which can transfer money to the gaming machine 10.

The player input device 24 comprises a plurality of push buttons 26 on a button panel for operating the gaming machine 10. In addition, or alternatively, the player input device 24 may comprise a touch screen 28 mounted by adhesive, tape, or the like over the primary display 14 and/or secondary display 16. The touch screen 28 contains soft touch keys 30 denoted by graphics on the underlying primary display 14 and used to operate the gaming machine 10. The touch screen 28 provides players with an alternative method of input. A player enables a desired function either by touching the touch screen 28 at an appropriate touch key 30 or by pressing an appropriate push button 26 on the button panel. The touch keys 30 may be used to implement the same functions as push buttons 26. Alternatively, the push buttons 26 may provide inputs for one aspect of the operating the game, while the touch keys 30 may allow for input needed for another aspect of the game.

The various components of the gaming machine 10 may be connected directly to, or contained within, the housing 12, as seen in FIG. 1*a*, or may be located outboard of the housing 12 and connected to the housing 12 via a variety of different wired or wireless connection methods. Thus, the gaming machine 10 comprises these components whether housed in the housing 12, or outboard of the housing 12 and connected remotely.

The operation of the basic wagering game is displayed to the player on the primary display 14. The primary display 14 can also display the bonus game associated with the basic wagering game. The primary display 14 may take the form of a cathode ray tube (CRT), a high resolution LCD, a plasma display, an LED, or any other type of display suitable for use in the gaming machine 10. As shown, the primary display 14 includes the touch screen 28 overlaying the entire display (or a portion thereof) to allow players to make game-related selections. Alternatively, the primary display 14 of the gaming machine 10 may include a number of mechanical reels to display the outcome in visual association with at least one payline 32. In the illustrated embodiment, the gaming machine 10 is an "upright" version in which the primary display 14 is oriented vertically relative to the player. Alternatively, the gaming machine may be a "slant-top" version in which the primary display 14 is slanted at about a thirty-degree angle toward the player of the gaming machine 10.

A player begins play of the basic wagering game by making a wager via the value input device 18 of the gaming machine 10. A player can select play by using the player input device 24, via the buttons 26 or the touch screen keys 30. The basic game consists of a plurality of symbols arranged in an array, and includes at least one payline 32 that indicates one or more outcomes of the basic game. Such outcomes are randomly selected in response to the wagering input by the player. At least one of the plurality of randomly-selected outcomes may be a start-bonus outcome, which can include any variations of symbols or symbol combinations triggering a bonus game.

In some embodiments, the gaming machine 10 may also include a player information reader 52 that allows for identification of a player by reading a card with information indicating his or her true identity. The player information reader 52 is shown in FIG. 1*a* as a card reader, but may take on many forms including a ticket reader, bar code scanner, RFID transceiver or computer readable storage medium interface. Currently, identification is generally used by casinos for rewarding certain players with complimentary services or special offers. For example, a player may be enrolled in the gaming establishment's loyalty club and may be awarded certain complimentary services as that player collects points in his or her player-tracking account. The player inserts his or her card into the player information reader 52, which allows the casino's computers to register that player's wagering at the gaming machine 10. The gaming machine 10 may use the secondary display 16 or other dedicated player-tracking display for providing the player with information about his or her account or other player-specific information. Also, in some embodiments, the information reader 52 may be used to restore game assets that the player achieved and saved during a previous game session.

Figure 1B:
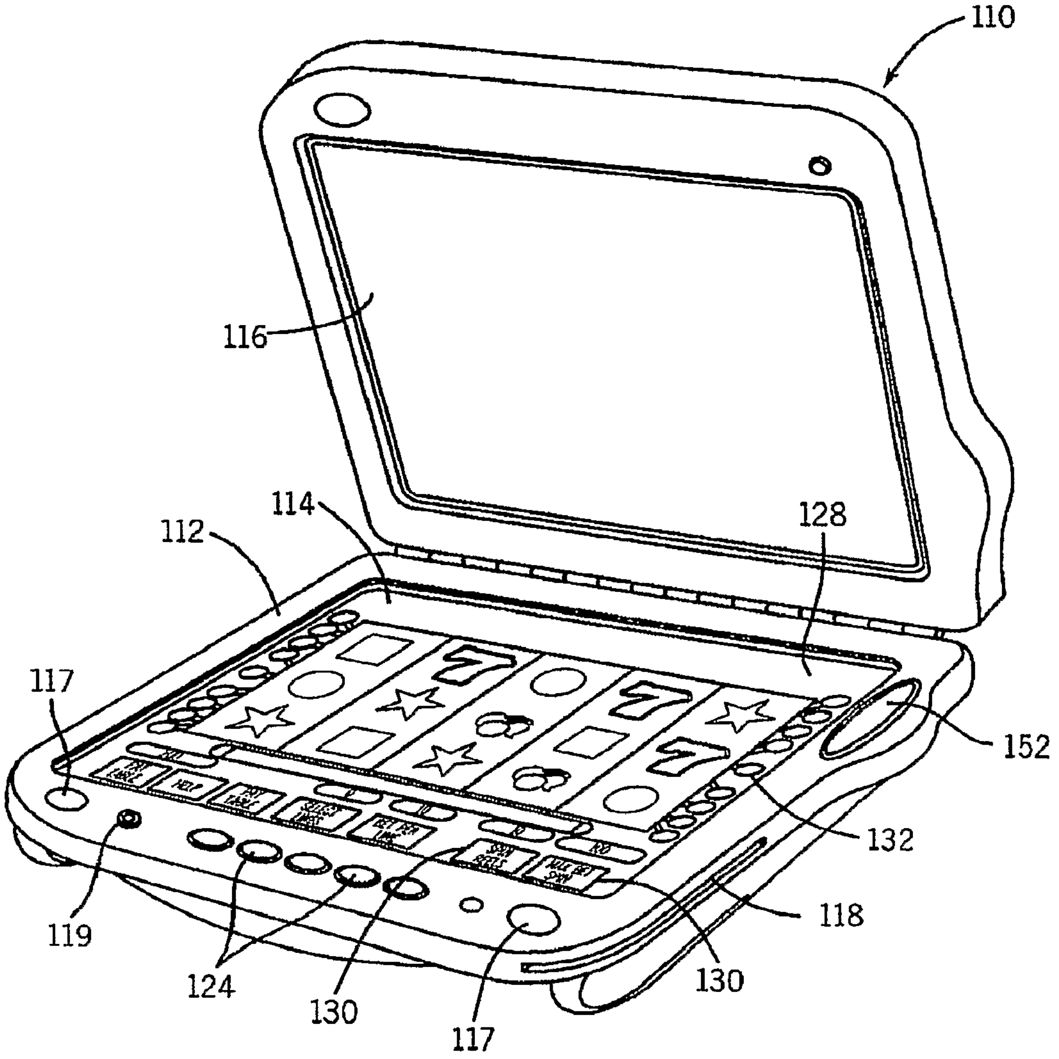
FIG. 1*b* is a perspective view of a handheld gaming machine embodying the present invention.

Depicted in FIG. 1*b* is a handheld or mobile gaming machine 110. Like the free standing gaming machine 10, the handheld gaming machine 110 is preferably an electronic gaming machine configured to play a video casino game such as, but not limited to, blackjack, slots, keno, poker, blackjack, and roulette. The handheld gaming machine 110 comprises a housing or casing 112 and includes input devices, including a value input device 118 and a player input device 124. For output the handheld gaming machine 110 includes, but is not limited to, a primary display 114, a secondary display 116, one or more speakers 117, one or more player-accessible ports 119 (e.g., an audio output jack for headphones, a video headset jack, etc.), and other conventional I/O devices and ports, which may or may not be player-accessible. In the embodiment depicted in FIG. 1*b*, the handheld gaming machine 110 comprises a secondary display 116 that is rotatable relative to the primary display 114. The optional secondary display 116 may be fixed, movable, and/or detachable/attachable relative to the primary display 114. Either the primary display 114 and/or secondary display 116 may be configured to display any aspect of a non-wagering game, wagering game, secondary games, bonus games, progressive wagering games, group games, shared-experience games or events, game events, game outcomes, scrolling information, text messaging, emails, alerts or announcements, broadcast information, subscription information, and handheld gaming machine status.

The player-accessible value input device 118 may comprise, for example, a slot located on the front, side, or top of the casing 112 configured to receive credit from a stored-value card (e.g., casino card, smart card, debit card, credit card, etc.) inserted by a player. In another aspect, the player-accessible value input device 118 may comprise a sensor (e.g., an RF sensor) configured to sense a signal (e.g., an RF signal) output by a transmitter (e.g., an RF transmitter) carried by a player. The player-accessible value input device 118 may also or alternatively include a ticket reader, or barcode scanner, for reading information stored on a credit ticket, a card, or other tangible portable credit or funds storage device. The credit ticket or card may also authorize access to a central account, which can transfer money to the handheld gaming machine 110.

Still other player-accessible value input devices 118 may require the use of touch keys 130 on the touch-screen display (e.g., primary display 114 and/or secondary display 116) or player input devices 124. Upon entry of player identification information and, preferably, secondary authorization information (e.g., a password, PIN number, stored value card number, predefined key sequences, etc.), the player may be permitted to access a player's account. As one potential optional security feature, the handheld gaming machine 10 may be configured to permit a player to only access an account the player has specifically set up for the handheld gaming machine 110. Other conventional security features may also be utilized to, for example, prevent unauthorized access to a player's account, to minimize an impact of any unauthorized access to a player's account, or to prevent unauthorized access to any personal information or funds temporarily stored on the handheld gaming machine 110.

The player-accessible value input device 118 may itself comprise or utilize a biometric player information reader which permits the player to access available funds on a player's account, either alone or in combination with another of the aforementioned player-accessible value input devices 118. In an embodiment wherein the player-accessible value input device 118 comprises a biometric player information reader, transactions such as an input of value to the handheld device, a transfer of value from one player account or source to an account associated with the handheld gaming machine 110, or the execution of another transaction, for example, could all be authorized by a biometric reading, which could comprise a plurality of biometric readings, from the biometric device.

Alternatively, to enhance security, a transaction may be optionally enabled only by a two-step process in which a secondary source confirms the identity indicated by a primary source. For example, a player-accessible value input device 118 comprising a biometric player information reader may require a confirmatory entry from another biometric player information reader 152, or from another source, such as a credit card, debit card, player ID card, fob key, PIN number, password, hotel room key, etc. Thus, a transaction may be enabled by, for example, a combination of the personal identification input (e.g., biometric input) with a secret PIN number, or a combination of a biometric input with a fob input, or a combination of a fob input with a PIN number, or a combination of a credit card input with a biometric input. Essentially, any two independent sources of identity, one of which is secure or personal to the player (e.g., biometric readings, PIN number, password, etc.) could be utilized to provide enhanced security prior to the electronic transfer of any funds. In another aspect, the value input device 118 may be provided remotely from the handheld gaming machine 110.

The player input device 124 comprises a plurality of push buttons 126 on a button panel for operating the handheld gaming machine 110. In addition, or alternatively, the player input device 124 may comprise a touch screen mounted to a primary display 114 and/or secondary display 116. In one aspect, the touch screen is matched to a display screen having one or more selectable touch keys 130 selectable by a user's touching of the associated area of the screen using a finger or a tool, such as a stylus pointer. A player enables a desired function either by touching the touch screen at an appropriate touch key 130 or by pressing an appropriate push button 126 on the button panel. The touch keys 130 may be used to implement the same functions as push buttons 126. Alternatively, the push buttons 126 may provide inputs for one aspect of the operating the game, while the touch keys 130 may allow for input needed for another aspect of the game. The various components of the handheld gaming machine 110 may be connected directly to, or contained within, the casing 112, as seen in FIG. 1*b*, or may be located outboard of the casing 112 and connected to the casing 112 via a variety of hardwired (tethered) or wireless connection methods. Thus, the handheld gaming machine 110 may comprise a single unit or a plurality of interconnected parts (e.g., wireless connections) which may be arranged to suit a player's preferences.

The operation of the basic wagering game on the handheld gaming machine 110 is displayed to the player on the primary display 114. The primary display 114 can also display the bonus game associated with the basic wagering game. The primary display 114 preferably takes the form of a high resolution LCD, a plasma display, an LED, or any other type of display suitable for use in the handheld gaming machine 110. The size of the primary display 114 may vary from, for example, about a 2-3" display to a 15" or 17" display. In at least some aspects, the primary display 114 is a 7"-10" display. As the weight of and/or power requirements of such displays decreases with improvements in technology, it is envisaged that the size of the primary display may be increased. Optionally, coatings or removable films or sheets may be applied to the display to provide desired characteristics (e.g., anti-scratch, anti-glare, bacterially-resistant and anti-microbial films, etc.). In at least some embodiments, the primary display 114 and/or secondary display 116 may have a 16:9 aspect ratio or other aspect ratio (e.g., 4:3). The primary display 114 and/or secondary display 116 may also each have different resolutions, different color schemes, and different aspect ratios.

As with the free standing gaming machine 10, a player begins play of the basic wagering game on the handheld gaming machine 110 by making a wager (e.g., via the value input device 18 or an assignment of credits stored on the handheld gaming machine via the touch screen keys 130, player input device 124, or buttons 126) on the handheld gaming machine 10. In at least some aspects, the basic game may comprise a plurality of symbols arranged in an array, and includes at least one payline 132 that indicates one or more outcomes of the basic game. Such outcomes are randomly selected in response to the wagering input by the player. At least one of the plurality of randomly selected outcomes may be a start-bonus outcome, which can include any variations of symbols or symbol combinations triggering a bonus game.

In some embodiments, the player-accessible value input device 118 of the handheld gaming machine 110 may double as a player information reader 152 that allows for identification of a player by reading a card with information indicating the player's identity (e.g., reading a player's credit card, player ID card, smart card, etc.). The player information reader 152 may alternatively or also comprise a bar code scanner, RFID transceiver or computer readable storage medium interface. In one presently preferred aspect, the player information reader 152, shown by way of example in FIG. 1, comprises a biometric sensing device.

Figure 2:
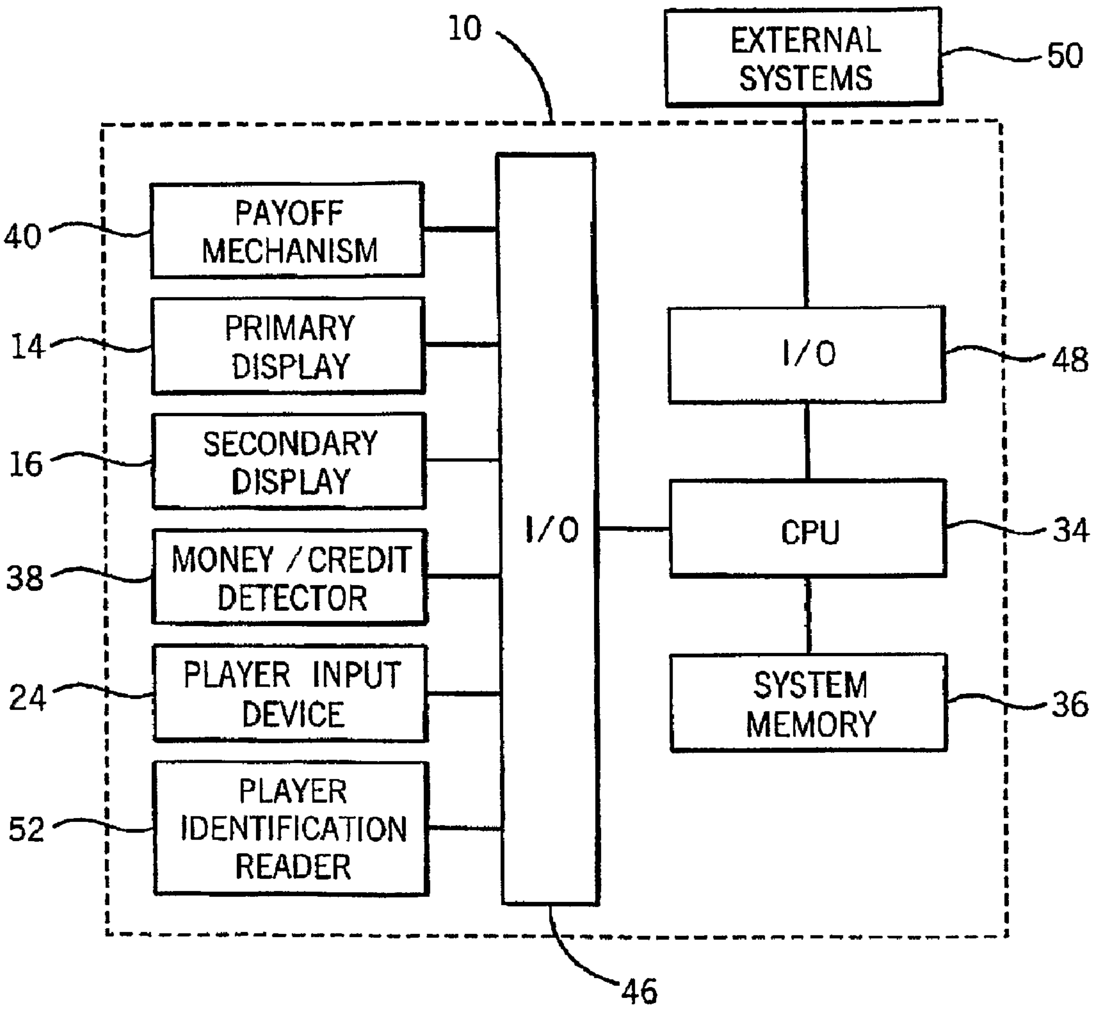
FIG. 2 is a block diagram of a control system suitable for operating the gaming machines of FIGS. 1*a* and 1*b;*

Turning now to FIG. 2, the various components of the gaming machine 10 are controlled by a central processing unit (CPU) 34, also referred to herein as a controller or processor (such as a microcontroller or microprocessor). To provide gaming functions, the controller 34 executes one or more game programs stored in a computer readable storage medium, in the form of memory 36. The controller 34 performs the random selection (using a random number generator (RNG)) of an outcome from the plurality of possible outcomes of the wagering game. Alternatively, the random event may be determined at a remote controller. The remote controller may use either an RNG or pooling scheme for its central determination of a game outcome. It should be appreciated that the controller 34 may include one or more microprocessors, including but not limited to a master processor, a slave processor, and a secondary or parallel processor.

The controller 34 is also coupled to the system memory 36 and a money/credit detector 38. The system memory 36 may comprise a volatile memory (e.g., a random-access memory (RAM)) and a non-volatile memory (e.g., an EEPROM). The system memory 36 may include multiple RAM and multiple program memories. The money/credit detector 38 signals the processor that money and/or credits have been input via the value input device 18. Preferably, these components are located within the housing 12 of the gaming machine 10. However, as explained above, these components may be located outboard of the housing 12 and connected to the remainder of the components of the gaming machine 10 via a variety of different wired or wireless connection methods.

As seen in FIG. 2, the controller 34 is also connected to, and controls, the primary display 14, the player input device 24, and a payoff mechanism 40. The payoff mechanism 40 is operable in response to instructions from the controller 34 to award a payoff to the player in response to certain winning outcomes that might occur in the basic game or the bonus game(s). The payoff may be provided in the form of points, bills, tickets, coupons, cards, etc. For example, in FIG. 1, the payoff mechanism 40 includes both a ticket printer 42 and a coin outlet 44. However, any of a variety of payoff mechanisms 40 well known in the art may be implemented, including cards, coins, tickets, smartcards, cash, etc. The payoff amounts distributed by the payoff mechanism 40 are determined by one or more pay tables stored in the system memory 36.

Communications between the controller 34 and both the peripheral components of the gaming machine 10 and external systems 50 occur through input/output (I/O) circuits 46, 48. More specifically, the controller 34 controls and receives inputs from the peripheral components of the gaming machine 10 through the input/output circuits 46. Further, the controller 34 communicates with the external systems 50 via the I/O circuits 48 and a communication path (e.g., serial, parallel, IR, RC, 10bT, etc.). The external systems 50 may include a gaming network, other gaming machines, a gaming server, communications hardware, or a variety of other interfaced systems or components. Although the I/O circuits 46, 48 may be shown as a single block, it should be appreciated that each of the I/O circuits 46, 48 may include a number of different types of I/O circuits.

Controller 34, as used herein, comprises any combination of hardware, software, and/or firmware that may be disposed or resident inside and/or outside of the gaming machine 10 that may communicate with and/or control the transfer of data between the gaming machine 10 and a bus, another computer, processor, or device and/or a service and/or a network. The controller 34 may comprise one or more controllers or processors. In FIG. 2, the controller 34 in the gaming machine 10 is depicted as comprising a CPU, but the controller 34 may alternatively comprise a CPU in combination with other components, such as the I/O circuits 46, 48 and the system memory 36. The controller 34 may reside partially or entirely inside or outside of the machine 10. The control system for a handheld gaming machine 110 may be similar to the control system for the free standing gaming machine 10 except that the functionality of the respective on-board controllers may vary.

The gaming machines 10,110 may communicate with external systems 50 (in a wired or wireless manner) such that each machine operates as a "thin client," having relatively less functionality, a "thick client," having relatively more functionality, or through any range of functionality therebetween. As a generally "thin client," the gaming machine may operate primarily as a display device to display the results of gaming outcomes processed externally, for example, on a server as part of the external systems 50. In this "thin client" configuration, the server executes game code and determines game outcomes (e.g., with a random number generator), while the controller 34 on board the gaming machine processes display information to be displayed on the display(s) of the machine. In an alternative "thicker client" configuration, the server determines game outcomes, while the controller 34 on board the gaming machine executes game code and processes display information to be displayed on the display(s) of the machines. In yet another alternative "thick client" configuration, the controller 34 on board the gaming machine 110 executes game code, determines game outcomes, and processes display information to be displayed on the display(s) of the machine. Numerous alternative configurations are possible such that the aforementioned and other functions may be performed onboard or external to the gaming machine as may be necessary for particular applications. It should be understood that the gaming machines 10,110 may take on a wide variety of forms such as a free standing machine, a portable or handheld device primarily used for gaming, a mobile telecommunications device such as a mobile telephone or personal daily assistant (PDA), a counter top or bar top gaming machine, or other personal electronic device such as a portable television, MP3 player, entertainment device, etc.

As noted above, wagering games having progressive games or progressive-award winning outcomes are known. Examples include U.S. Pat. Nos. 6,159,098, 6,749,510, and 6,939,234 and U.S. Patent Application Publications 2004/0242320, 2005/0003880, 2005/0059472, and 2006/0003829, each of these patents and patent application publications being incorporated herein in their entirety. A detailed description of the entry into such progressive games or the achieving of a progressive-award winning outcome are omitted for brevity.

The present concepts relate to the provision of a multiplier for any type of progressive game, no matter what the particular mechanism leading to the achieving of the progressive-award winning outcome. The progressive-award winning outcome may be associated with any wagering game or associated game, such as a bonus game, progressive game, or multi-level progressive game. Examples of such multi-level progressive games include "Jackpot Party" manufactured by WMS Gaming Inc. of Illinois and "Millioniser" manufactured by Aristocrat Technologies of Australia. The present concepts are not limited to any particular wagering game, progressive game, or type of progressive game (e.g., single-level or multi-level, etc.).

Figure 3:
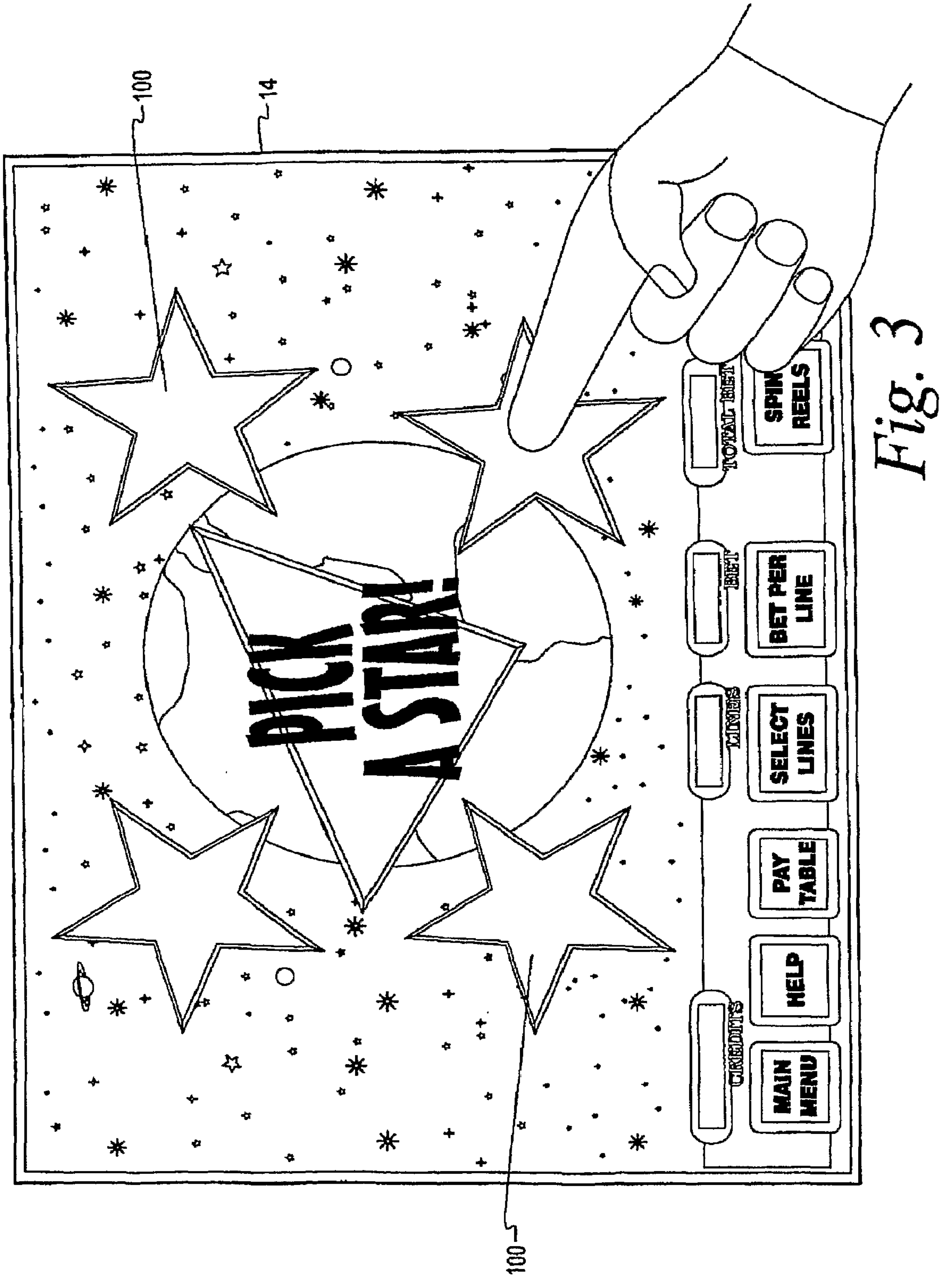
FIG. 3 illustrates an example of a display permitting selection of a hidden progressive-award multiplier in accord with at least some aspects of the present concepts.
Figure 5:
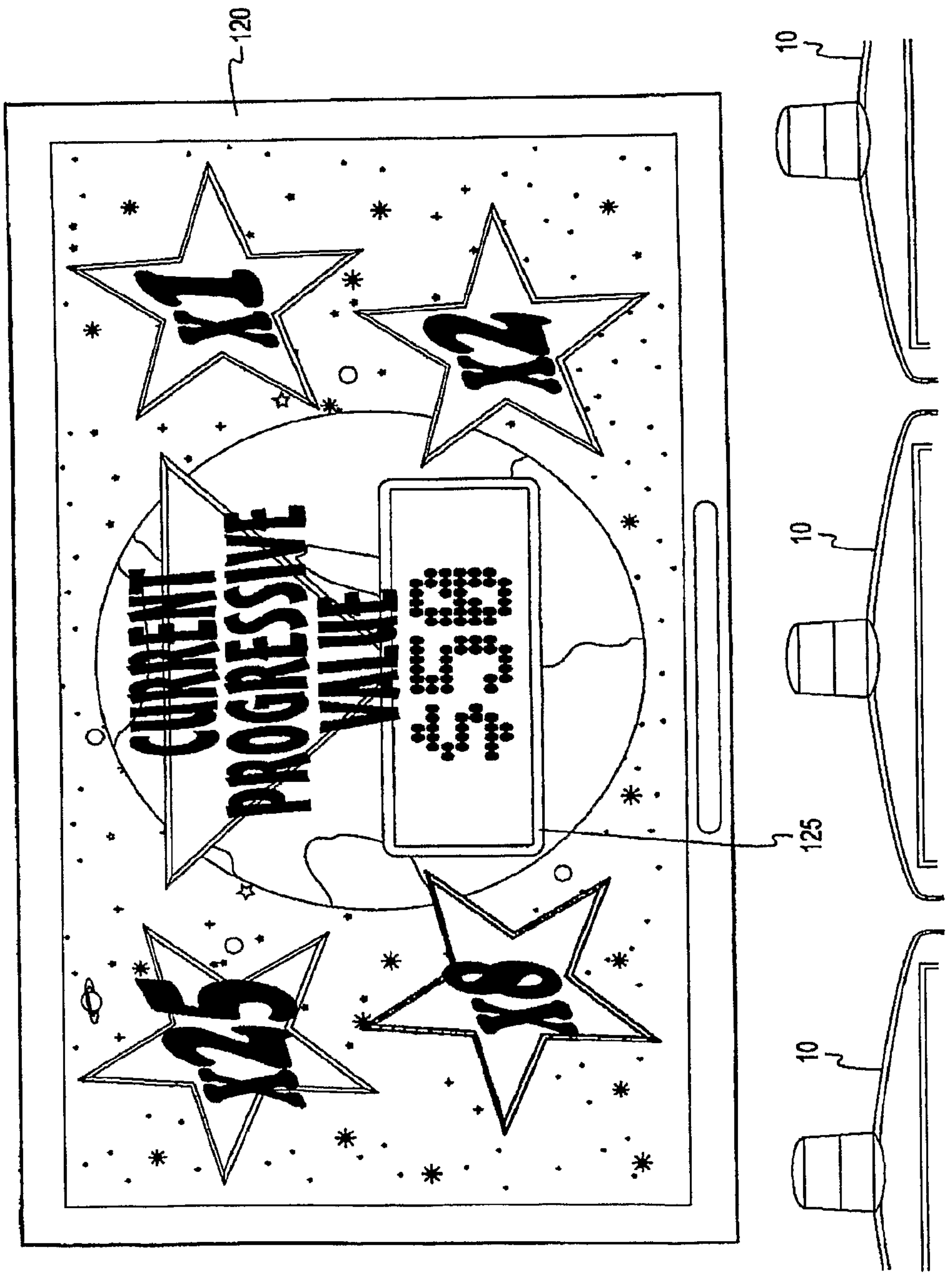
FIG. 5 illustrates an example of a signage or area display showing a current progressive value fund pool value and permissible progressive multiplier values in accord with at least some aspects of the present concepts.

An example of a progressive multiplier selection in accord with at least some aspects of the present concepts is shown in the selection display depicted in FIG. 3. In this example, subsequent to a player's achieving of a progressive-award winning outcome in a multi-level progressive game, the player is permitted to pick one of a plurality of selectable elements 100, represented in FIG. 3 as stars. The selectable elements 100 could comprise any other visual representation, typically representations which are at least generally consistent with a theme of the game (e.g., symbols, images, reel symbols, cards, etc.). Each selectable element 100 (e.g., star) is associated with one of a plurality of permissible values of a multiplier for the "current progressive value" displayed on, for example, signage 120, as shown in FIG. 5. The multiplier value for each of the selectable elements 100 is initially concealed and is revealed upon selection by a player. In another aspect, the player may permit the controller 34 to select a random one of the selectable elements 100, such as by permitting a lapse of a selection count-down timer or by input of an instruction to the controller to perform a random selection of the selectable elements. In still another aspect, the controller 34 may be configured to automatically select a random one of the selectable elements 100.

In accord with at least some aspects of the present concepts, the population of the selectable elements 100 and/or the multiplier values for each of the selectable elements may be influenced by and/or determined by the random outcomes in the basic wagering game and/or bonus game preceding a progressive game entry event. Still further, in accord with at least some other aspects of the present concepts, the population of the selectable elements 100 and/or the multiplier values for each of the selectable elements may be influenced by and/or determined by player selections or computer selections in a bonus game or other selection-based game preceding the opportunity for a player to select a selectable element 100 corresponding to a progressive multiplier. For example, four selectable elements 100 having concealed multipliers are displayed in FIG. 3. In a screen presented to a player prior to that displayed in FIG. 3, the player might have been presented with a picking game, the outcome of which determined how many selectable elements 100 were presented (e.g., 3, 4, 5, etc.) and/or the potential values or spread of values attributable to the subsequently displayed selectable elements 100. Still further, in accord with at least some other aspects of the present concepts, the population of the selectable elements 100 and/or the multiplier values for each of the selectable elements may be influenced by and/or determined by a player's initial wager or a player's subsequent wager (e.g., a side-bet). In other words, in at least some aspects of the present concepts, a player's decisions affect the progressive multiplier selection to enhance player involvement and excitement and to enhance game play variability. Thus, in accord with at least these examples, the population of the selectable elements 100 and/or the multiplier values associated with each of the selectable elements may be influenced by aspects of game-play related inputs (e.g., a player input during a game) or non-game-play related inputs (e.g., input of a minimum wager amount or play of a minimum number of paylines or particular combination of paylines, etc.).

Figure 4:
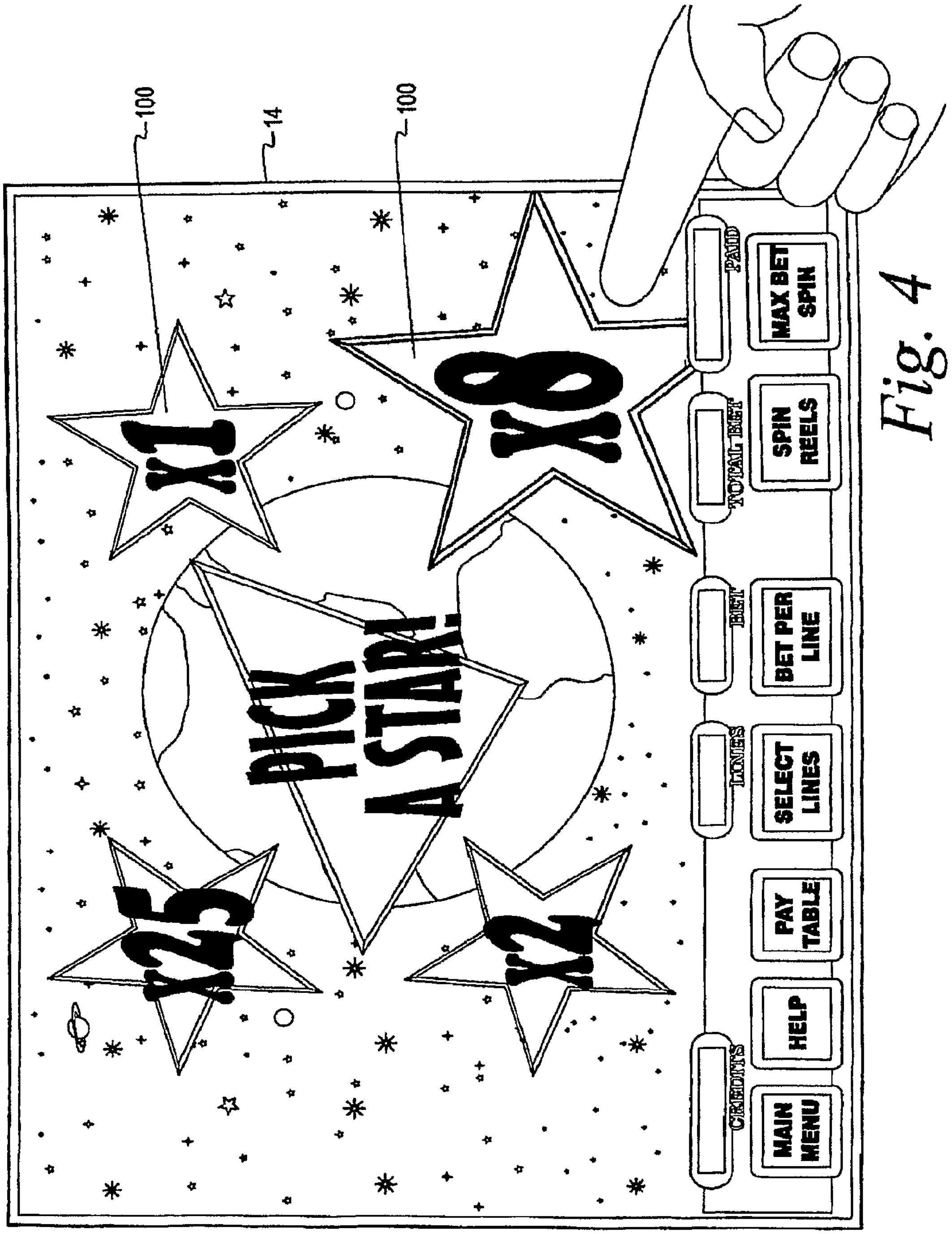
FIG. 4 illustrates an example of a display following selection of a progressive-award multiplier of FIG. 3.

FIG. 4 shows that, following or concurrent with a player's selection of the selectable element 100 in the lower right of the display, the value of the progressive-award multiplier associated with at least the selected one of the selectable elements is revealed. In the example of FIG. 4, the selectable element 100 selected by the player is an eight times ("×8") multiplier. The other selectable element 100 are also revealed, in this example, to display the possible one time ("×1"), two times ("×2"), and twenty-five times ("×25") multipliers. The number of selectable elements 100 displayed in FIGS. 3-4 merely represent one potential example of the present concepts. A greater or lesser number of selectable elements 100 may be presented for selection by the player (or computer) and the values of the progressive multipliers may be varied to any extent desired. Additionally, plural selectable elements 100 may bear the same progressive multiplier (e.g., five "×1" multipliers, five "×2" multipliers, and one "×25" multiplier). The selectable elements 100 could also bear sequential (e.g., "×1," "×2," "×3," "×4," "×5," etc.), rather than non-sequential, progressive multipliers, as depicted in the example. As shown, the selectable element 100 is itself desirably, but optionally, visually highlighted, such as by coloration and/or resizing or other visual effect. The value of the player's selection may also optionally be presented in yet another field, such as the field in the center of the display in FIG. 4, which states that the "current progressive value" is to be multiplied by "×8" based on the player's selection of the available selectable elements.

FIG. 5 shows an example wherein the signage 120, or area display associated with the individual gaming machines 10, displays the "current progressive value" to the players of the gaming machines together with the potential multiplier values for the "current progressive value" (e.g., "×1," "×2," "×8," "×25"). As shown, the "current progressive value" for this example is $50. Thus, instead of displaying four different progressive values (e.g., $50, $100, $400, and $1250), the signage 120 shows only one "current progressive value" along with the available multiplier values.

Figure 6:
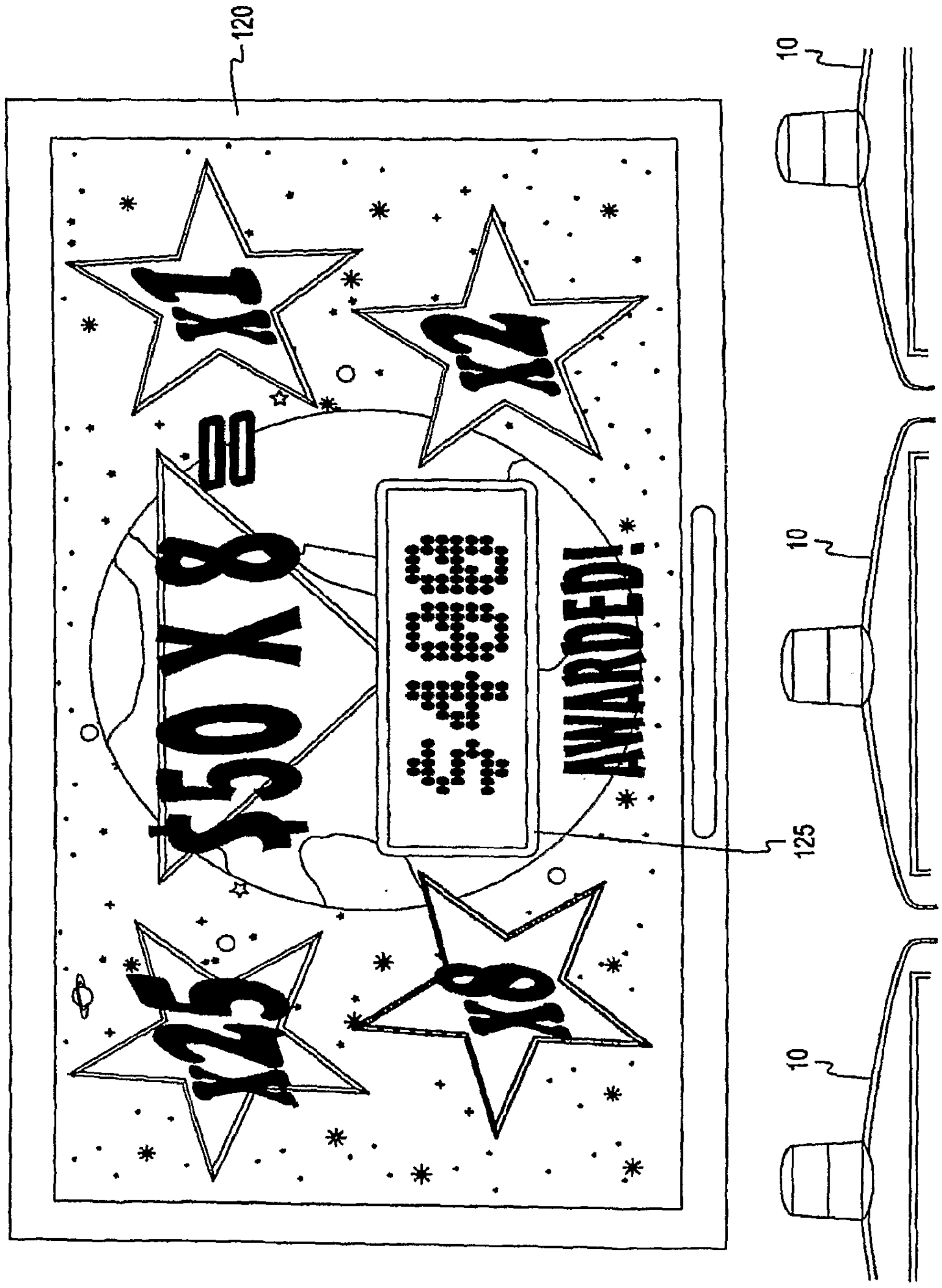
FIG. 6 illustrates an example of the signage of FIG. 5 displaying the enhanced progressive-award value awarded to a player that has selected a progressive multiplier of eight times in accord with at least some aspects of the present concepts.

FIG. 6 shows another example of the signage 120 of FIG. 5, wherein the signage shows that a player has won a progressive-award and has selected a selectable element 100 which multiplied the "current progressive value" shown in FIG. 5 by eight times ("×8") to yield a progressive-award of $400.

Figure 7:
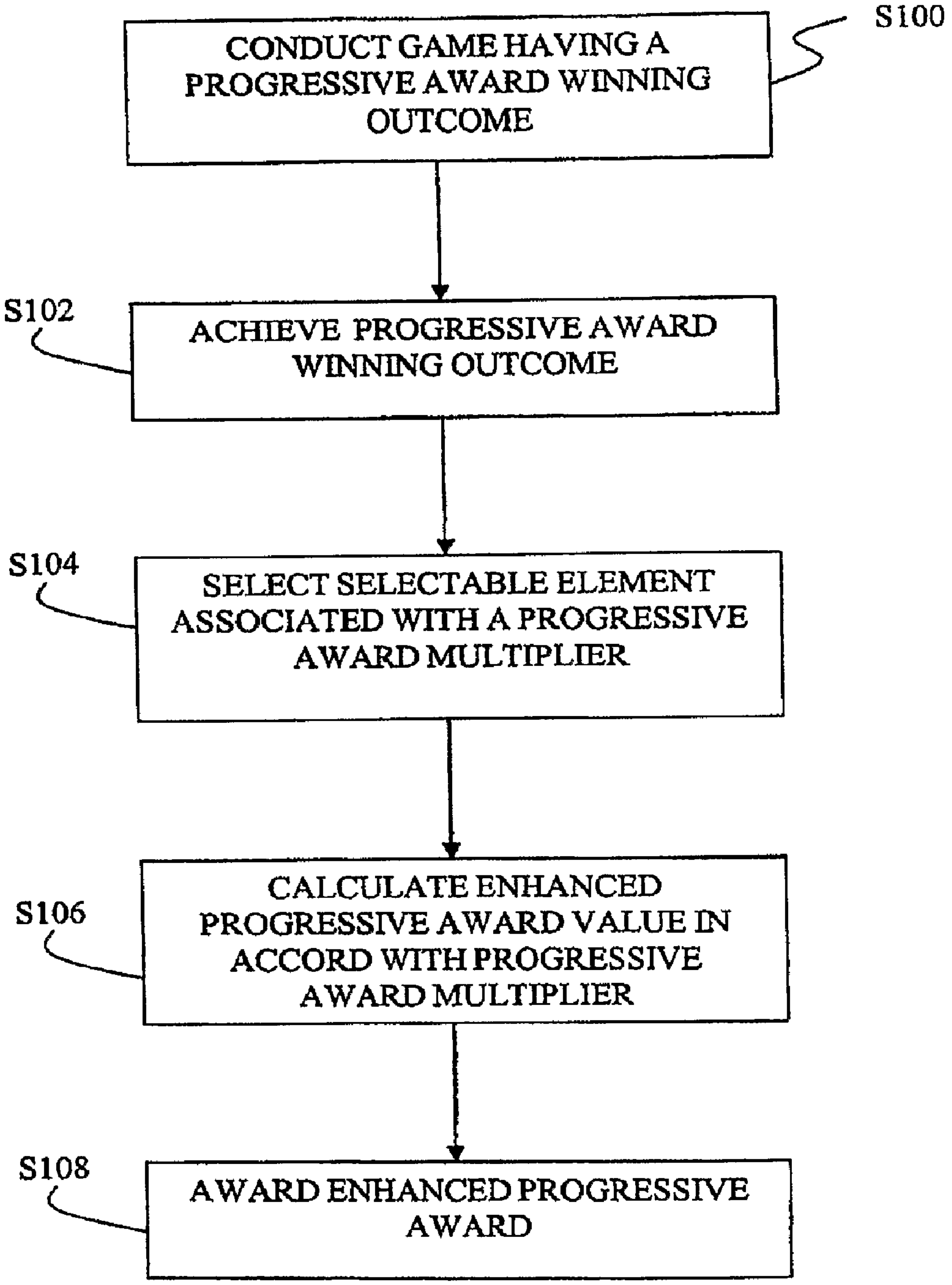
FIG. 7 is a flow chart showing at least some acts in accord with at least some aspects of the present concepts.

Turning now to FIG. 7, operations detailing with at least one method of progressive game play comprising the present aspects are shown. Act S100 comprises a player's playing of a wagering game at a wagering game machine 10, such wagering game having a progressive-award winning outcome associated therewith. This act S100 would generally comprise acts such as, but not limited to, a player's making of various non-game related inputs (e.g., a wager, selection of paylines to play, assignment of wager between paylines, etc.) and/or game related inputs (e.g., pressing play button, spinning reels, selection of elements in a picking screen, etc.). In act S102, the player is shown to achieve a progressive-award winning outcome. As noted above, the progressive-award winning outcome may occur in any phase of play of a wagering game and may occur, for example, in a basic game, a bonus game, a separate progressive game, or the like. The eligibility for the progressive-award winning outcome my be optionally conditioned on one or more factors. For example, the player might be rendered eligible for a progressive-award winning outcome if the player chooses to play all of the paylines and/or the player wagers the maximum amount on each of the paylines played. In other aspects, the player may be automatically eligible for the progressive-award winning outcome and would not be required to make a minimum wager or to play a minimum number of lines. In some other embodiments, a "side-wager" option may confer eligibility for the progressive game. The "side-wager" option is described in U.S. patent application Ser. No. 10/659,878, filed on Sep. 11, 2003, entitled "Gaming Machine With Multi-Level Progressive Jackpot," which is commonly owned and herein incorporated by reference in its entirety.

In act S104, once a player has successively achieved a progressive-award winning outcome, the player is prompted to select a selectable element 100 which is associated with a progressive-award multiplier. After the player's selection of a selectable element 100, the progressive-award multiplier is revealed to the player and the enhanced progressive-award value is calculated, in act S106, in accord with the progressive-award multiplier selected by the player. The enhanced progressive-award is then awarded to the player in act S108, such as is described above by way of example with respect to FIGS. 3-6.

Figure 8:
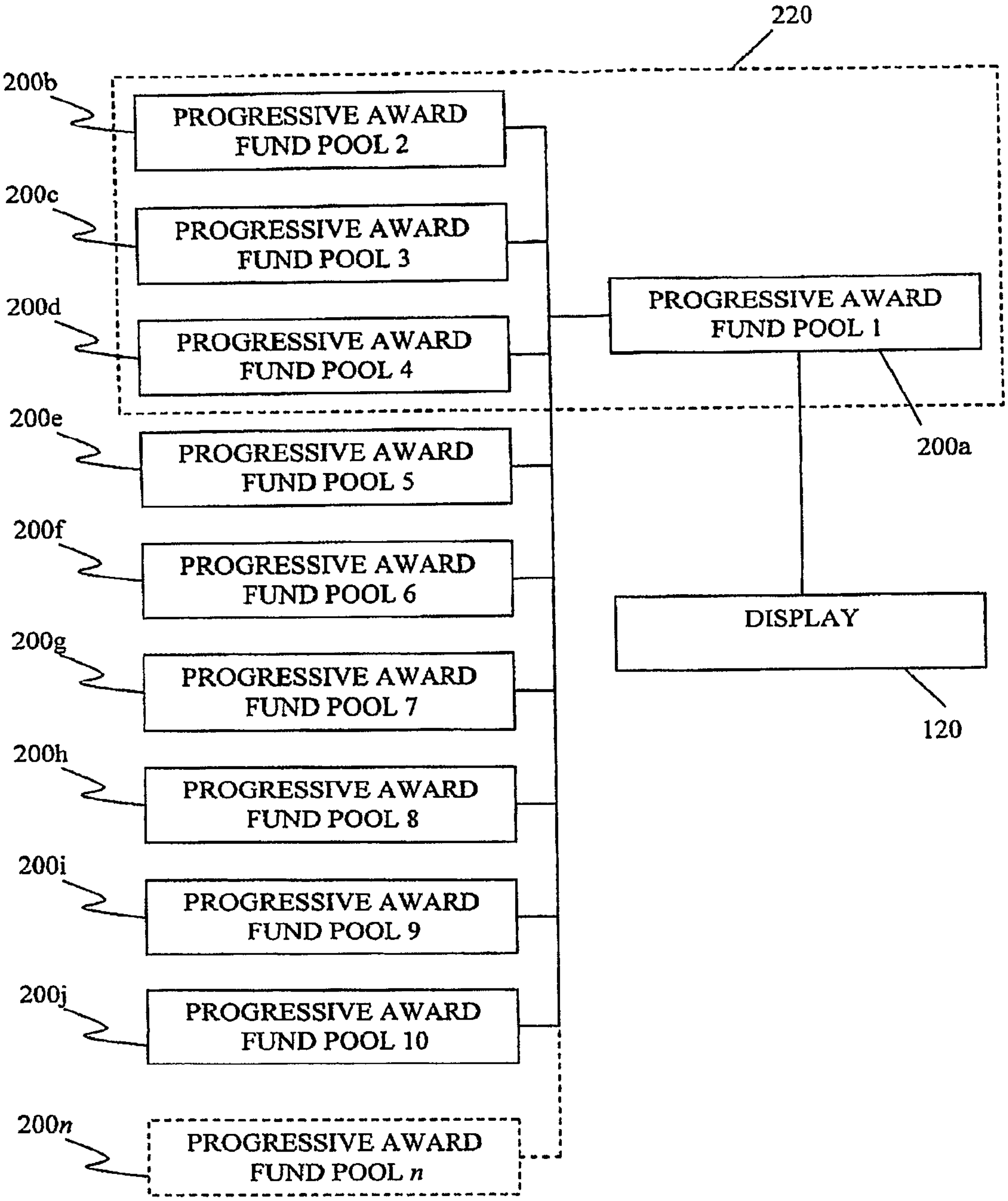
FIG. 8 shows a representation of the progressive-award fund pools in accord with at least some aspects of the present concepts.

As shown best in FIG. 8, the progressive-award multipliers associated with the selectable elements 100 are also associated with a respective plurality of progressive-award fund pools 200*a-n*, where n may comprise any integer. One of the progressive-award fund pools 200*a-n* is displayed as a visible progressive-award fund pool (e.g. 200*a* in FIG. 8) or "current progressive value," such as shown on signage 120 in FIG. 5. The progressive-award fund pools 200*a-n* are preferably at least substantially identical, if not identical, to one another. Thus, when a player achieves a progressive-award winning outcome and selects a selectable element 100 to reveal an associated progressive-award multiplier, the enhanced progressive-award value is not a single progressive-award multiplied by a multiplier, but rather a sum of a plurality of separate progressive-award fund pools 200*a-n* (see FIG. 8). In one aspect of the present concepts, the number of progressive-award fund pools 200*a-n* corresponds to the number of the highest progressive-award multiplier. In another aspect of the present concepts, the number of progressive-award fund pools 200*a-n* is greater than the number of the highest progressive-award multiplier and may comprise, for example, a multiple of the number of the highest progressive-award multiplier.

In a conventional progressive, the progressive value starts at a "reset value" amount, and then a percentage of each wager, referred to as the "contribution," is sent to the progressive meter or account. In the case of the progressive multiplier in accord with at least some aspects of the present concepts, the contribution is divided by the number of progressive-award fund pools 200*a-n*. In one example, the number of progressive-award fund pools 200*a-n* corresponds to that of the highest progressive-award multiplier. Thus, in such aspect, if the top progressive-award multiplier were "×10," then ten progressive-award fund pools 200*a-j* would be funded from the contribution.

The division of the contribution in this manner will, consequently, slow the rate at which the progressive meter increases. The effect may be attenuated, in some respects, by starting the progressive meter significantly below the reset value so that the odometer rate can start to move at a quicker pace before achieving the reset value.

As noted above, once a player achieves a progressive-award winning outcome, the player is permitted to provide an input to the wagering game machine 10 or other input device to select one of a plurality of selectable elements (e.g., 100, FIGS. 3-4). Upon selection of a selectable element 100, the selectable element will reveal a progressive-award multiplier which is to be associated with "current progressive value" displayed on a display 14 and/or signage 120. For an example wherein the progressive-award multipliers range in value from between "×1" and "×10," ten (or more) progressive-award fund pools 200*a-n* may be provided, such as is represented in FIG. 8. The selectable elements 100 may be associated (e.g. randomly associated) with any number or multiple within the range. In the above example, progressive-award multipliers of "×2," "×4," "×8," and "×10" may be provided, as one example. If a player selects a selectable element 100 having a progressive multiplier value of "×4," the player will receive an enhanced progressive-award comprising the value associated with four of the progressive-award fund pools 200*a-n*, such as represented by the grouping 220 in FIG. 8 of one "visible" progressive-award fund pool 200*a* and three "hidden" progressive-award fund pools 210*b-d*. The enhanced progressive-award is represented to the player, however, as a multiple of the "current progressive value" in accord with the selected progressive-award multiplier value. For example, A*4=X, rather than A+B+C+D=X, where B, C, and D may have the same value as A or a different value than A, but are preferred to be at least substantially identical to A.

In the example shown in FIG. 8, a player has selected a progressive-award multiplier of "×4," from a range of progressive-award multipliers of between "1×" and "×10." Although shown to the player as a "×4" multiplier for the displayed "current progressive value," the player has, in fact, won four progressive-award fund pools 200*a-n*, such as shown by the grouping 220 in FIG. 8. In this example, six out of the ten "hidden" progressive-award fund pools 200*e-j* would remain. Any combination of the progressive-award fund pools 200*a-n* may be selected for disbursement of the enhanced progressive-award.

In at least some aspects of the present concepts, the combined value of the six remaining progressive-award fund pools 200*e-j* would be aggregated and redistributed equally to the nine hidden progressive fund pools 200*b-j* and the one visible progressive fund pool 200*a* (i.e., the displayed "current progressive value"). To illustrate, if it is assumed in FIG. 8 that the initial total value of all of the progressive-award fund pools 200*a-j* was $1000, distributed evenly therebetween, and a player selecting a selectable element 100 having a progressive multiplier value of "×4" associated therewith, one "visible" progressive-award 200*a* and three "hidden" progressive-awards 210*b-d*, may be provided as an enhanced progressive-award value of $400. In this example, $600 remains for redistribution and, in one aspect of the present concepts, $60 is associated with each of the ten progressive-award fund pools 200*a-j*.

Most conventional progressive-award meters lag behind the actual value associated with the progressive. The progressive meters move smoothly, but aren't usually dramatically lower than the actual amount. When a progressive-award winning outcome is achieved, the displayed progressive-award value automatically corrects or jumps to display the actual progressive value.

In accord with at least some aspects of the present concepts, the "current progressive value" would be displayed at the comparatively lower or lagging rate. Then, in lieu of the automatic correction to display the actual progressive-award fund pool 200*a* value, such display would be delayed slightly and, with some attendant computer-generated fanfare, a "booster value" (i.e., the correction) would be added to the "current progressive value." For example, if the originally displayed (lagging) "current progressive value" 200*a* was $95 and the actual progressive-award fund pool 200*a* value were $100, the correction would be $5 and the display of the actual progressive-award fund pool 200*a* value (i.e. $100 in this example) would be delayed slightly and a "booster value" (i.e., the correction of $5) would be added to the previously displayed (lagging) "current progressive value."

In one alternative, a holdback on the contribution (i.e., a percentage or share of each contribution) could be diverted to a buffer to help equalize and/or facilitate any desired distribution of the contributions to the predetermined number of progressive-award fund pools 200*a-n*. This holdback could, in at least one aspect, form the "booster value" to be added to the progressive-award fund pool(s) 200*a-n* awarded to a player. For example, the displayed "current progressive value" might be $95, rather than an actual progressive-award fund pool 200*a* value of $100. The difference of $5 per progressive-award fund pool 200*a-n*, for a total of $50 could be temporarily held within a buffer and award in whole, or in part, to a player winning a corresponding portion of the progressive-award fund pool(s). Thus, for the example of FIG. 8, wherein a player is awarded a grouping 220 of one "visible" progressive-award fund pool 200*a* and three "hidden" progressive-award fund pools 200*b-d*, the player may receive $95 from each of the noted progressive-award fund pools 200*a-d* and the $5 holdback from each in the form of a booster value of $20.

In still another aspect, a single large progressive-award fund pool could be provided and the "current progressive value" would display a fractional percentage of such value (e.g., 1%, 2%, 4%, 5%, 10%, 25%, etc.), which could optionally be rounded up or down to provide a desired incremental progression (e.g., increments of $1, $5, etc.). In such embodiment, the progressive-award multiplier selected by the player (e.g., "×8") would determine a percentage of the single large progressive-award fund pool to be awarded to the player. For example, if the "current progressive value" shows $50, as in the example of FIG. 5, such value being five percent of the single large progressive-award fund pool ($1000 in this example), and the player selects a progressive-award multiplier of "×8," the player would be awarded forty percent (i.e., 8 parts of 5% for a total of 40%) or $400 of the single large progressive fund pool.

While the present invention has been described with reference to one or more particular embodiments, those skilled in the art will recognize that many changes may be made thereto without departing from the spirit and scope of the present invention. For example, in still other aspects, an optional buffer may be added to, for example, facilitate maintenance of a desired minimum "current progressive value" even after the awarding of an award. In yet additional aspects, the total number of hidden progressive-award fund pools need not be the same as the highest multiplier available for selection in the selectable elements 100. For example, the total number of progressive-award fund pools (e.g., 50 substantially identical progressive-award fund pools) may be higher than the highest multiplier available (e.g., "×10") in the selectable elements 100. In such embodiment, the aggregation and redistribution of the hidden progressives and the one visible progressive after they are returned to the original reset value could involve the entire set of remaining progressive-award fund pools, or a subset thereof. In yet other aspects, the relation between the progressive-award fund pools and progressive-award multiplier values could be adjusted to achieve any desired effect, such as to increase a displayed "current progressive value" by provided smaller progressive-award multiplier values and by redistributing the value of a plurality of progressive-award fund pools to a smaller number to progressive-award fund pools. The progressive-award multiplier could optionally include fractional values (e.g., "×½"). These examples show non-limiting aspects highlighting the variability of game configuration and game play in accord with the present concepts.

In still other aspects of the present concepts, the draw down of the progressive-award fund pools associated with either the awarding of an enhanced progressive value award and/or aggregating and distributing a remainder following such awarding, could include only a portion of one or more of the progressive-award fund pools. In the example of FIG. 8, wherein progressive-award fund pools 200*a-d* were applied to a player's progressive-award. In the present aspect, the progressive-award could be drawn from a greater number of progressive-award fund pools (e.g., 200*a-h* or 200*a-j*). Thus, instead of a progressive-award being drawn from four progressive-award fund pools 200*a-d* for a one-to-one correspondence between the value of the progressive-award multiplier and the number of awarded progressive-award fund pools, the progressive-award may be drawn from a greater or lesser number of progressive-award fund pools 200*a-n*, in whole or in part, for other than a one-to-one correspondence between the value of the progressive-award multiplier and the number of awarded progressive-award fund pools. For example, with respect to FIG. 8, a "×4" multiplier could be satisfied by awarding a player half of a value for each of progressive-award fund pools 200*a-h*. As another example, again with respect to FIG. 8, a "×4" multiplier could be satisfied by awarding a player all of progressive-award fund pool 200*a*, half of each of progressive-award fund pools 200*b-e*, and twenty percent of each of progressive-award fund pools 200*f-j*.

In still another aspect of the present concepts, the aforementioned selectable elements 100 may comprise a progressive-award enhancer other than a multiplier. For example, the progressive-award enhancer may comprise a credit value, a credit value related to a number of fund pools or a value, a credit value related to a portion of a value of a number of find pools, or even a temporal shift in the progressive to artificially designate progressive-award winning outcome as occurring a predetermined time later than the actual time at which such progressive-award winning outcome occurred (e.g., 5 seconds, 15 seconds, 30 seconds, 1 minute, etc.) to thereby associate a greater value of coin-in to apply to the player's progressive-award winning outcome.

In accord with the present concepts, the selection of the aforementioned selectable elements 100 may be performed by a player or by a controller 34. In still other aspects, in a competitive or cooperative play environment, it is possible that the selection could be performed by another player. Still further, the selection of the aforementioned selectable elements 400 may comprise the converse of selection, namely de-selection. In other words, the displayed selectable elements could be selected and discarded until a single selectable element 100 remains, which is then treated by default as the selected selectable element.

In still other aspects, the selectable elements 100 may be revealed, rather than concealed. For example, a plurality of selectable elements 100 having displayed (i.e., not concealed) progressive-award enhancers could populate a wheel which is spun by a player or by a controller 34 to randomly determine which one of the displayed selectable elements 100 and associated displayed progressive-award enhancers is to be associated with a current progressive value.

Still further, the present concepts include selection of more than one selectable element 100. For example, the player may be permitted to select a plurality of selectable elements 100 and the player permitted to "keep" the highest value progressive-award enhancer for application to a current progressive value. In another example, the player may be permitted to select three selectable elements 100, discard the lowest value progressive-award enhancer, and sum or multiply the remaining two progressive-award enhancers to yield a final progressive-award enhancer.

In other aspects, a plurality of separate progressive-award fund pools 200*a-n*, 300*a-n*, 400*a-n*, etc. may be provided. Each of these separate progressive-award fund pools 200*a-n*, 300*a-n*, 400*a-n*, comprises a plurality of at least substantially identical, if not identical, progressive-award fund pools (e.g., progressive-award fund pool 400*a* is at least substantially identical, if not identical, to each of progressive-award fund pool 400*b-n*, but is different from progressive-award fund pools 200*a-n* and 300*a-n*). In this case, each of the separate progressive-award fund pools 200*a-n*, 300*a-n*, 400*a-n* would be associated with a different progressive value.

Still further, in at least a variation of the above concepts employing a plurality of separate progressive-award fund pools 200*a-n*, 300*a-n*, etc., a player achieving a progressive-award winning outcome may be permitted to select (or the controller 34 may select) a selectable element 100 associated with a progressive-award enhancer before the progressive-award fund pool to which the progressive-award enhancer is to be applied is known. For example, a player achieving a progressive-award winning outcome may select a selectable element 100 associated with a progressive-award enhancer that is an "×10" multiplier. At the point of selection of the selectable element 100, the player may not know which of the separate progressive-award fund pools 200*a-n*, 300*a-n*, etc. to which the progressive-award enhancer of "×10" is to be applied. The determination of which progressive-award fund pool (e.g., 200*a-n*, 300*a-n*, etc.) to which the progressive-award enhancer is to be applied may be achieved by any desired method. For example, such determination could be a random determination (e.g., RNG) by the controller 34, the result of a selection game wherein the player selects a selectable element from among a plurality of displayed selectable elements, each of the displayed selectable elements being associated with a particular progressive-award fund pool.

Yet further, in at least one other variation of the above concepts employing a plurality of separate progressive-award fund pools 200*a-n*, 300*a-n*, etc., a player achieving a progressive-award winning outcome may be automatically awarded a particular progressive-award enhancer, which is displayed to the player. The progressive-award enhancer may be determined by any desired means such as, but not limited to, a purely random result determined by a controller 34 or as a result of game-related or non-game-related inputs. For example, a player achieving a progressive-award winning outcome may be informed that they have been awarded a progressive-award enhancer of "×10," but they would not know, at that point, the current progressive value to which the progressive-award enhancer would be applied. The determination of the progressive-award fiend pool (e.g., 200*a-n*, 300*a-n*, etc.) to which the progressive-award enhancer is to be applied could then be achieved by a selection of a selectable element 100 from among a plurality of displayed selectable elements, each of the displayed selectable elements being associated with a particular progressive-award fund pool. In this example, the progressive-award enhancer (e.g. a progressive-award multiplier) is known to the player, but the current progressive value to be associated to the progressive-award winning outcome is not initially known. The current progressive value to be associated to the progressive-award winning outcome is revealed to the player only in response to the selection of a selectable element 100 (e.g., by a player or by a controller) to reveal the progressive-award fund pool associated therewith.

Each of these embodiments, combinations of embodiments, combinations of aspects of various different embodiments, and obvious variations thereof are contemplated as falling within the spirit and scope of the claimed invention, which is set forth in the following claims. Also expressly included within the spirit and scope of the claimed invention are any permutation or combination of the dependent claims set forth herein with a respective one of the independent claims, irrespective of the presently claimed dependency.

What is claimed is:

1. A method for playing wagering games at which players are eligible for a progressive game, the method comprising:

in response to receiving, via one or more input devices, wager inputs from said players, conducting wagering games in which said players are eligible to win said progressive game;

funding said progressive game by a portion of said wager inputs, said progressive game having a certain number of fund pools greater than one, each of said fund pools receiving a substantially equivalent share of said funding portion;

displaying, via a display device, a progressive-game award value that is substantially equivalent to an amount of a single one of said fund pools; and in response to triggering a progressive-award winning outcome, displaying to the player, via the display device, a plurality of selectable elements, each of said selectable elements being associated with a progressive-game award multiplier that increases said progressive-game award value to an enhanced-progressive-award value, said progressive game multiplier dictating the number of said fund pools to be used to award said enhanced-progressive-award value to said player, the displaying of the progressive-game award value starting prior to displaying the progressive-game award multiplier associated with the selected selectable element.

2. The method of claim 1, further comprising:

receiving a selection of one of said plurality of selectable elements; and revealing a progressive-game award multiplier associated with said selected selectable element.

3. The method of claim 1, wherein said certain number of fund pools comprises twenty five fund pools.

4. The method of claim 3, wherein said progressive game multiplier ranges in value from between one and twenty five.

5. A method for playing wagering games with a progressive game, the method comprising:

in response to receiving, via one or more input devices, wager inputs from players, conducting wagering games in which said players are eligible to win said progressive game;

funding said progressive game by a portion of said wager inputs, said progressive game having a certain number of fund pools, each of said fund pools receiving a substantially equivalent share of said funding portion;

displaying, via a display device, a progressive-game award value that is substantially equivalent to an amount of one of said fund pools;

in response to a triggering of a progressive-award winning outcome, displaying to a player a plurality of selectable elements, each of said selectable elements being associated with a progressive-game award multiplier that increases said progressive-game award value to an enhanced-progressive-award value, said progressive game multiplier dictating the number of said fund pools to be used to award said enhanced-progressive-award value to said player;

receiving a selection of one of said plurality of selectable elements;

revealing a progressive-game award multiplier associated with said selected selectable element;

awarding said enhanced-progressive-award value;

aggregating a total value associated with said certain number of fund pools following said awarding said enhanced-progressive-award value; and distributing the aggregated total value at least substantially equally between said certain number of fund pools.

6. The method of claim 5, wherein said certain number of fund pools comprises twenty five fund pools, and wherein said progressive game multiplier ranges in value from between one and twenty five.

7. A method for playing wagering games at which players are eligible for a progressive game, the method comprising:

in response to receiving, via one or more input devices, wager inputs from said players, conducting wagering games in which said players are eligible to win said progressive game;

funding said progressive game by a portion of said wager inputs, said progressive game having a number of fund pools, said number being an integer between 2 and "n", each of said fund pools receiving a substantially equivalent share of said funding portion;

displaying, via a display device, a progressive-game award that is substantially equivalent to an amount of a single one of said fund pools; and in response to triggering a progressive game outcome, providing a player with a progressive-game multiplier that increases said progressive-game award to an enhanced-progressive-award value, said progressive-game multiplier being selected from a plurality of multipliers that have an integer value between 2 and "n"; the displaying of the progressive-game award starting prior to displaying the provided progressive-game award multiplier.

8. The method of claim 7, further comprising:

receiving a selection of one of said plurality of selectable elements; and revealing a progressive-game award multiplier associated with said selected selectable element.

9. The method of claim 7, wherein said certain number of fund pools comprises twenty five fund pools.

10. The method of claim 9, wherein said progressive game multiplier ranges in value from between one and twenty five.

11. A method for playing wagering games with a progressive game, the method comprising:

in response to receiving, via one or more input devices, wager inputs from players, conducting wagering games in which said players are eligible to win said progressive game;

funding said progressive game by a portion of said wager inputs, said progressive game having a number of fund pools, said number being an integer between 2 and "n", each of said fund pools receiving a substantially equivalent share of said funding portion;

displaying, via a display device, a progressive-game award that is substantially equivalent to an amount of one of said fund pools;

in response to a triggering of a progressive game outcome, providing a player with a progressive-game multiplier that increases said progressive-game award to an enhanced-progressive-award value, said progressive-game multiplier being selected from a plurality of multipliers that have an integer value between 2 and "n";

receiving a selection of one of said plurality of selectable elements;

revealing a progressive-game award multiplier associated with said selected selectable element;

awarding said enhanced-progressive-award value;

aggregating a total value associated with said certain number of fund pools following said awarding said enhanced-progressive-award value; and distributing the aggregated total value at least substantially equally between said certain number of fund pools.

12. A method for structuring a progressive-award, the method comprising:

receiving wager inputs at a plurality of gaming machines;

providing a plurality of at least substantially equal progressive-award fund pools;

distributing a percentage of the wager inputs among said progressive-award fund pools;

displaying, via a display device, a progressive-game award that is substantially equivalent to an amount of only one of said progressive-award fund pools;

displaying, via the display device, a plurality of selectable elements, each of said selectable elements being related to a progressive-award multiplier;

receiving selection of a selectable element to reveal a concealed progressive-award multiplier;

displaying the select progressive-award multiplier; and determining an enhanced progressive-award value by summing a value of a number of said progressive-award fund pools corresponding to said progressive-award multiplier.

13. A method for structuring a progressive-award according to claim 12, wherein each of said selectable elements conceals a progressive-award multiplier.

14. A method for structuring a progressive-award according to claim 13, further comprising:

awarding said enhanced progressive-award value.

15. A method for structuring a progressive-award, the method comprising:

receiving, via one or more input devices, wager inputs at a plurality of gaming machines;

providing a plurality of at least substantially equal progressive-award fund pools;

distributing a percentage of the wager inputs among said progressive-award fund pools;

displaying, via a display device, a plurality of selectable elements, each of said selectable elements being related to and concealing a progressive-award multiplier;

receiving selection of a selectable element to reveal a select progressive-award multiplier;

determining an enhanced progressive-award value by summing a value of a number of said progressive-award fund pools corresponding to said progressive-award multiplier;

awarding said enhanced progressive-award value;

aggregating a total remaining value associated with said progressive-award fund pools following said awarding of said enhanced progressive-award value; and distributing the aggregated total value at least substantially equally among said progressive-award fund pools.

16. A method for structuring a progressive-award, the method comprising:

receiving wager inputs at a plurality of gaming machines;

providing a plurality of progressive-award fund pools;

displaying, via a display device, a progressive game award value substantially equal to an amount of a single one of said fund pools;

distributing a percentage of the wager inputs among said progressive-award fund pools;

displaying, via the display device, a plurality of selectable elements, each of said selectable elements being related to a concealed progressive-award enhancer;

receiving selection of a selectable element to reveal a concealed progressive-award enhancer;

displaying the progressive-award enhancer associated with the selected selectable element; and determining an enhanced progressive-award value by summing a value of a number of said progressive-award fund pools corresponding to said progressive-award enhancer.

17. A method for structuring a progressive-award according to claim 16, wherein each of said selectable elements conceals a progressive-award enhancer.

18. A method for structuring a progressive-award according to claim 16, further comprising:

awarding said enhanced progressive-award value.

19. A method for structuring a progressive-award, the method comprising:

receiving wager inputs at a plurality of gaming machines;

providing a plurality of progressive-award fund pools;

displaying, via a display device, a progressive game award value substantially less than a cumulative value of said fund pools;

distributing a percentage of the wager inputs among said progressive-award fund pools;

displaying, via the display device, a plurality of selectable elements, each of said selectable elements being related to a progressive-award enhancer;

receiving selection of a selectable element to reveal a concealed progressive-award enhancer; and determining an enhanced progressive-award value by summing a value of a number of said progressive-award fund pools corresponding to said progressive-award enhancer;

awarding said enhanced progressive-award value;

aggregating a total remaining value associated with said progressive-award fund pools following said awarding of said enhanced progressive-award value; and distributing the aggregated total value at least substantially equally among said progressive-award fund pools.

20. A gaming system comprising:

a wager input device configured to receive a wager to play a wagering game;

a display configured to display a randomly selected outcome;

a controller operative to:

conduct a wagering game, conduct a progressive game associated with the wagering game, the progressive game having a plurality of substantially equal fund pools each receiving a substantially equivalent portion of wager inputs received by the gaming system, direct the display to display a progressive-game award value that is substantially equivalent to a single one of said fund pools, determine if a progressive-award winning outcome is achieved in said wagering game, direct the display to display a plurality of selectable elements, each of said selectable elements being related to a concealed progressive-award enhancer, direct the display to display the progressive-award enhancer associated with a selected one of the selectable elements, and determine an enhanced progressive-award value.

21. A gaming system according to claim 20, wherein said progressive-award enhancer comprises a progressive-award multiplier.

22. A gaming system according to claim 21, wherein said controller is further operative to determine said enhanced progressive-award value by summing a number of said progressive-award fund pools corresponding to a number of said progressive-award multiplier.

23. A gaming system according to claim 20, wherein said selectable elements comprise player-selectable elements.

24. A gaming system according to claim 20, wherein each of said selectable elements conceals a progressive-award multiplier associated therewith.

* * * * *